United States Patent
Swander et al.

(10) Patent No.: US 7,260,840 B2
(45) Date of Patent: Aug. 21, 2007

(54) MULTI-LAYER BASED METHOD FOR IMPLEMENTING NETWORK FIREWALLS

(75) Inventors: Brian D. Swander, Bellevue, WA (US); Gurdeep Singh Pall, Sammamish, WA (US); Nagampalli S. S. Narasimha Rao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 10/456,770

(22) Filed: Jun. 6, 2003

(65) Prior Publication Data

US 2005/0022011 A1 Jan. 27, 2005

(51) Int. Cl.
 *H04L 9/00* (2006.01)
(52) U.S. Cl. ...................................... 726/13
(58) Field of Classification Search ............ 726/11–14, 726/26; 709/232, 238, 332; 705/54
See application file for complete search history.

(56) References Cited

U.S. PATENT DOCUMENTS

| | | | |
|---|---|---|---|
| 5,987,611 A | 11/1999 | Freund | |
| 6,003,084 A | 12/1999 | Green et al. | |
| 6,009,475 A | 12/1999 | Shrader | |
| 6,496,935 B1 * | 12/2002 | Fink et al. | 726/13 |
| 6,701,432 B1 * | 3/2004 | Deng et al. | 713/153 |
| 6,832,256 B1 * | 12/2004 | Toga | 726/13 |
| 2002/0097724 A1 * | 7/2002 | Halme et al. | 370/392 |
| 2002/0162026 A1 | 10/2002 | Neuman et al. | |
| 2003/0084331 A1 | 5/2003 | Dixon et al. | |
| 2003/0110379 A1 * | 6/2003 | Ylonen et al. | 713/164 |
| 2004/0250131 A1 | 12/2004 | Swander et al. | |
| 2005/0005165 A1 | 1/2005 | Morgan et al. | |
| 2005/0010765 A1 | 1/2005 | Swander et al. | |
| 2005/0022010 A1 | 1/2005 | Swander et al. | |

OTHER PUBLICATIONS

Abhishek Vagish et al., NT 5.1 IPSecurity Security Policy Database, Microsoft Corporation, 1999.

* cited by examiner

*Primary Examiner*—Kambiz Zand
*Assistant Examiner*—Thomas Ho
(74) *Attorney, Agent, or Firm*—Wolf, Greenfield & Sacks, P.C.

(57) ABSTRACT

A method is provided for implementing a firewall in a firewall architecture. The firewall architecture includes a plurality of network layers and a first firewall engine. The layers send packets and packet information to the first firewall engine, maintain and pass packet context to subsequent layers, and process the packets. The first firewall engine compares the packet information to one or more installed filters and returns an action to the layers indicating how to treat the packet.

28 Claims, 12 Drawing Sheets

MULTI-LAYER BASED METHOD FOR IMPLEMENTING NETWORK FIREWALLS

RELATED APPLICATIONS

The present application contains subject matter related to that of patent application "Multi-Layered Firewall Architecture," Ser. No. 10/456,766; "A Method and Framework for Integrating a Plurality of Network Policies," Ser. No. 10/456,093; and "Method for Managing Network Filter Based Policy," Ser. No. 10/456,433; filed on the same day as the present application, the disclosures of which are hereby expressly incorporated by reference.

TECHNICAL FIELD

This invention generally relates to computer systems and to network security. More particularly, this invention relates to a method of implementing a firewall in a network device.

BACKGROUND OF THE INVENTION

Network protocols are designed to facilitate communication between network devices through an open exchange of data. While the open exchange of data greatly enhances the use of network devices to accomplish tasks, it also creates problems because network protocols are not designed for, and generally do not provide, network security. Computers coupled to both public and private networks, such as Local Area Networks (LANs), Wide Area Networks (WANs), intranets, and the Internet are susceptible to malicious attacks perpetrated by other network devices coupled either directly or indirectly to the network. Such malicious attacks include theft of data, Denial of Service (DOS) attacks, the proliferation of computer viruses, and the like. Other related issues arise when coupling computers to networks such as controlling access to undesirable or inappropriate web sites by children.

A firewall is a tool used to protect individual users, network devices, and networks in general, from malicious attacks, while also adding the ability to control the exchange of data over the network through implementation of a policy. The firewall implements the policy by examining network packets and determining, based on the examination, whether the packets should be permitted, or conversely blocked, from further traversing the network.

The policy implemented via the firewall is defined by one or more filters. Each filter includes filter parameters and an associated action. The filter parameters are used to identify network packets that are subject to the firewall policy and include information such as hardware addresses, e.g. Media Access Control (MAC) addresses, network addresses, e.g. Internet Protocol (IP) addresses, protocol type, e.g. Transport Control Protocol (TCP), port numbers, and the like. The action defines how packets with parameters that match the filter parameters should be treated. As a specific example, the filter includes as its parameters a Uniform Resource Locator (URL) address, e.g. "http://www.foo.com." The filter further associates the action of block, i.e. drop the packet, with that URL address. Whenever the firewall examines a packet and through that examination identifies the URL address "http://www.foo.com" as embedded in the packet, the firewall drops the packet thereby preventing it from traversing the network.

Network devices exchange data by sending and receiving packets through a network stack comprising a layered network architecture. While different network architecture models exist, most include at least an application layer, a transport layer, a network layer, and a link layer. Network packets traverse each layer sequentially and, as each layer is traversed, the packet is subject to processing. For outbound packets, the application layer processes data according to application protocols such as Hypertext Transfer Protocol (HTTP), File Transfer Protocol (FTP), and Simple Mail Transfer Protocol (SMTP) to name a few. Other layers, such as the network layer and the transport layer packetize the data by embedding it in TCP and IP headers. The layers perform reciprocal processing for inbound packets by, for example, parsing headers, unpacketizing data etc. The layered "stack" architecture and processing function performed by the layers results in a dynamic packet structure whereby packet content including the packet parameters change as the packet traverses the network protocol stack.

Firewalls examine packets at an inspection point located with the layered network stack. At one extreme, the inspection point is at the application layer. For example, the firewall is deployed as a Layered Service Provider (LSP). Packets at the application layer include the underlying data that will be transmitted to another network device or that has been received from another network device. Examining the packet at the application layer permits the firewall to identify application layer parameters, such as a URL address, and compare the application layer parameters to the filter parameters. However, other packet parameters such as IP addresses, port numbers, MAC addresses, and the like are not available because they have either not been added to outbound packets or have been parsed away from inbound packets.

At the other extreme, the firewall inspection point is implemented at lower levels of the network stack as an intermediate driver interposed between the link layer and the network layer. Packets at the lower levels of the network stack include a maximum number of parameters, e.g interface numbers, MAC addresses, IP addresses, protocol type, ports, and payload data. Although the packets include such parameters, it does not follow that the parameters are readily identifiable. After the firewall receives the packet, the firewall needs to parse and interpret the relevant packet parameter for comparison with the filter parameters. Thus, both the layers in the network stack and the firewall perform redundant packet parsing and interpretation functions.

SUMMARY OF THE INVENTION

The present invention is directed towards a method of implementing a firewall in a firewall framework. The firewall framework includes a plurality of layers, each of the layers being capable of processing packets according to a layer protocol, each of the layers further being capable of requesting a firewall policy to be applied to the packets. The firewall framework further includes a firewall engine that includes a plurality of installed filters.

A requesting layer receives a network packet from a previous layer in the plurality of layers. The requesting layer identifies a set of parameters from the packet and issues a classification call to the firewall engine with the set of parameters. In response, an action is returned to the requesting layer by the firewall engine. If the action is an instruction to permit the packet to further traverse the plurality of layers, the requesting layer processes the packet according to the layer protocol and sends the packet to a next layer in the plurality of layers. Conversely, if the action is an instruction to drop the packet, the layer does not process the packet and does not send the packet to the next layer.

Each filter in the set of installed filters includes a set of filter conditions and an action. When the requesting layer issues the classification call, the firewall engine determines if any filters in the plurality of installed filters match the set of parameters. The firewall engine then returns the action based on information in the matching filters.

The invention further provides a method of permitting packets from a trusted initiating device to traverse a firewall, generally configured to block unsolicited inbound packets, and reach a responding device. The initiating device first initiates authentication using a key negotiation protocol. Once the authentication is successfully completed, the responding computer creates a filter that permits packets from the initiating computer to reach a target process at the responding computer.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
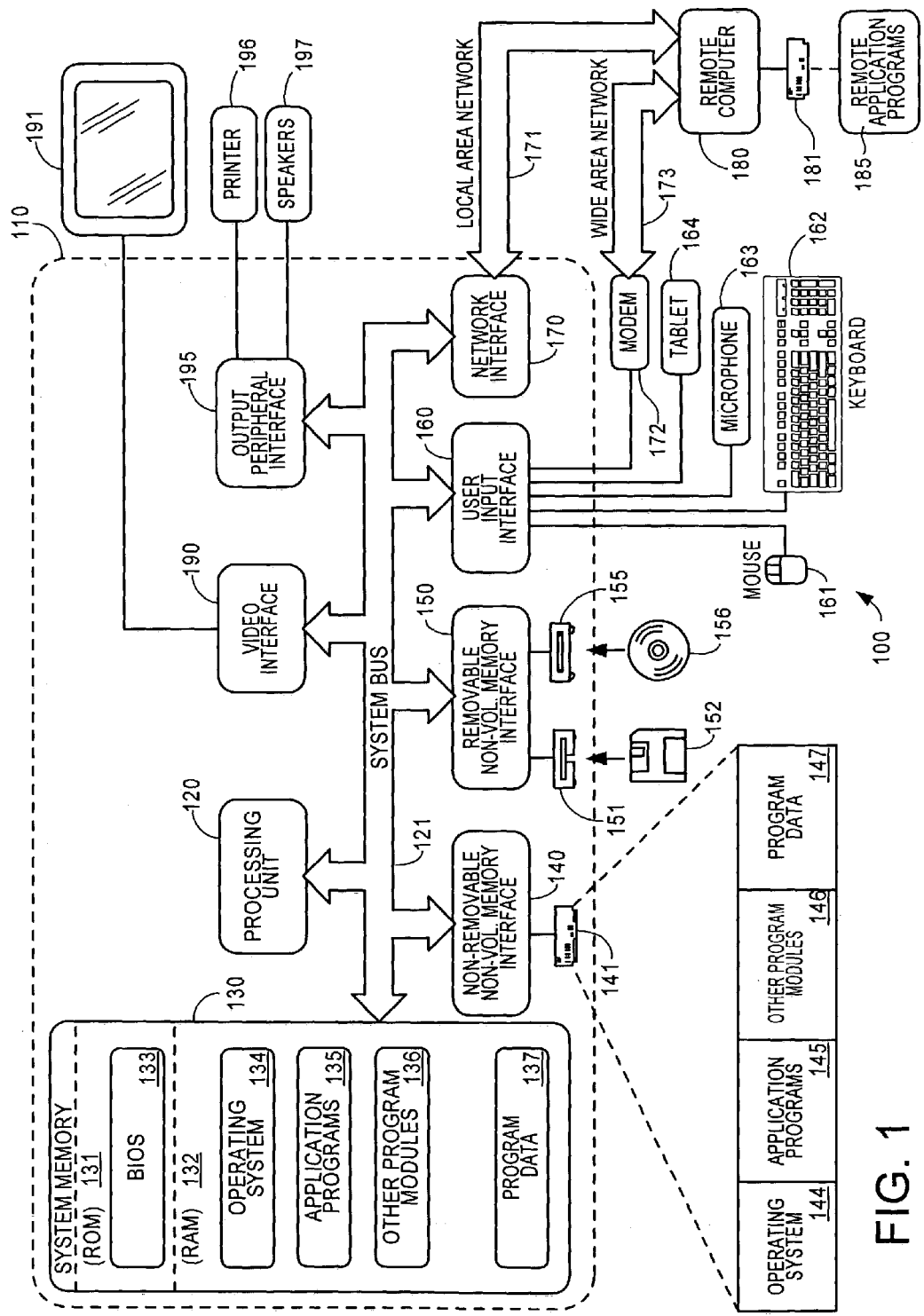
FIG. 1 is a block diagram generally illustrating an exemplary computer system on which the present invention resides.

A method of implementing a firewall according to a firewall architecture in a network device is described. The method subjects network packets to filters at multiple layers in a protocol stack. In one embodiment of the invention, the method and firewall architecture are implemented in a plurality of operating system processes, referred to as a kernel mode process and a user mode process. Alternatively, the method and architecture are implemented in a single operating system process, or in one or more program modules or application programs executing outside of the operating system.

The kernel mode processes includes a protocol stack, a kernel firewall engine, and one or more callouts. The protocol stack includes an application layer, a transport layer, a network layer, and link layer. Additional layers are added or deleted from the system as desired. The layers each form a requesting layer that receive the network packet and corresponding packet context data from a previous layer or process. The requesting layer then issues a classification request to the kernel firewall engine via a layer API. The classification request includes the packet received by the requesting layer, the packet context, and a set of layer parameters associated with the requesting layer. The kernel firewall engine processes the request and returns an action. The action, by way of example, instructs the requesting layer how to treat the packet (e.g. permit or block). If the action is permit, the requesting layer processes the packet according to a layer protocol, modifies the packet context to include the layer parameters, and passes the packet and packet context to a next layer. If the action is block, the requesting layer drops the packet and does not pass the packet to the next layer. The requesting layer may perform additional functions as a result of the block action, such as tearing down a TCP connection.

The kernel firewall engine includes the layer API, a set of installed filters, and a callout API. Each of the set of installed filters includes a set of filter conditions and an associated action. The kernel firewall engine processes the classification request sent from the requesting layer by identifying one or more matching filters. The matching filters have filter conditions that match the layer parameters and packet context. Once the matching filters are identified, they are applied in order of filter priority. If the action of the filtering being applied is permit or block, the action is returned to the requesting layer. If the action is callout, the classification request issued by the requesting layer, along with matching filter identification, is passed to one of the callout modules. The callout module performs its programmed function, and returns an action to the kernel firewall engine. If no matching filters are identified for a packet, the requesting layer is notified that no matching filters were found and the requesting layer then decides how to treat the packet.

Exemplary user mode processes include a user mode firewall engine and one or more policy providers. The policy providers obtain policies from any suitable source such as volatile or non-volatile memory. The policy is a source of information for rendering a new filter, including the set of filter conditions and associated actions. The user firewall engine adds the new filter to the set of installed filters in the kernel firewall engine via a filter engine API.

The user mode also includes an instance of the kernel firewall engine thereby permitting user mode layers to be created. The user mode layers then use the user mode instance of the kernel firewall engine to identify filters that match a set of parameters allowing the application of filtering within the user mode.

In an embodiment of the invention, a callout interface from the kernel firewall engine to a set of callout modules enables virtually unlimited extension of the firewall capabilities. By way of example, an HTTP context callout provides a parental feature by identifying acceptable and unacceptable URL addresses. An Internet Protocol Security (IPSec) callout verifies that packets have been properly subject to IPSec processing. A logging callout logs packets meeting established criteria thereby facilitating later examination of packets. An intrusion detection callout identifies suspicious packets based on known algorithms.

The invention also provides a method for permitting unsolicited communication with a trusted network device while blocking other unsolicited communication from other network devices.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
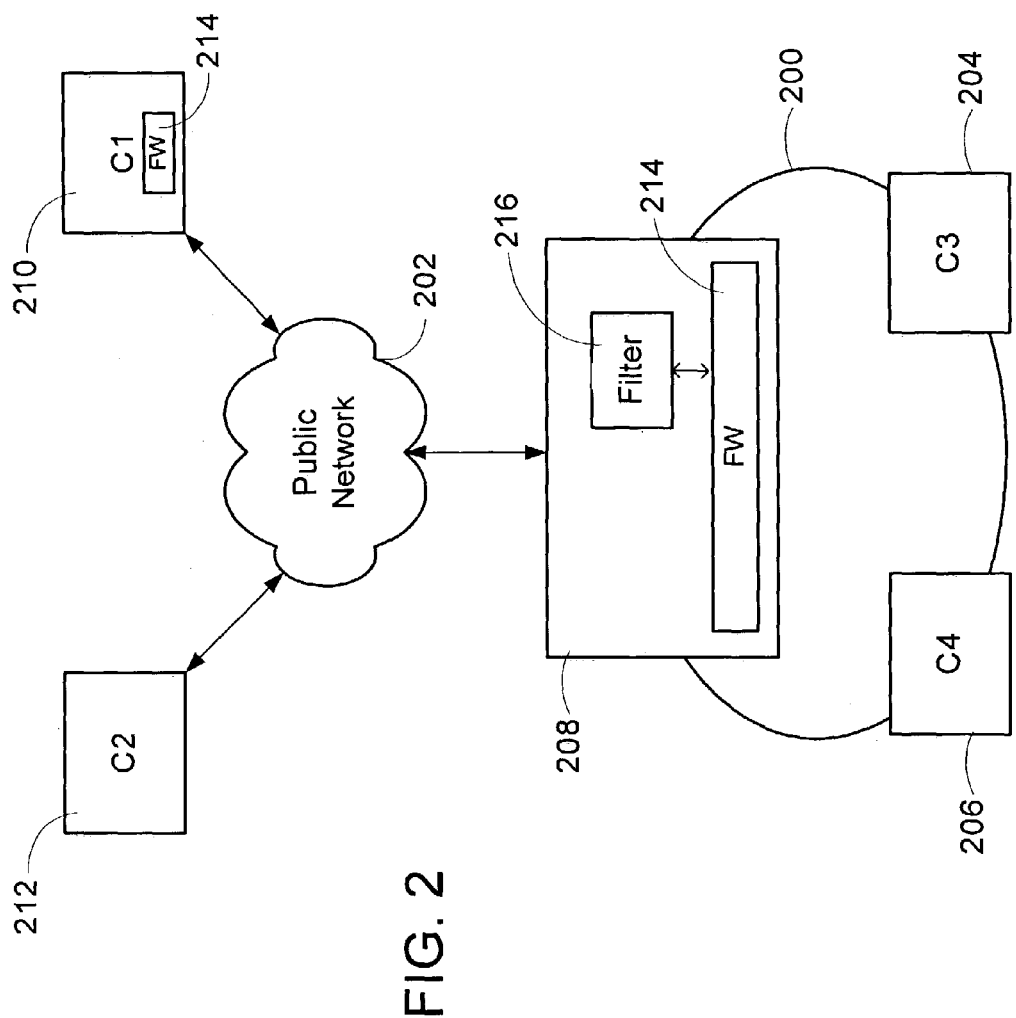
FIG. 2 is a block diagram generally illustrating an exemplary network environment whereby the present invention is employed.

A network environment wherein the method of implementing a firewall of the present invention is used will now be described with reference to FIG. 2. The network is exemplary in nature as the method of the present invention is implemented in any network device that is coupled to any network configuration. The network environment includes a private network 200 and a public network 202. The private network 200 and public network 202 are any suitable type such as Local Area Networks (LANs), Wide Area Networks (WANs), intranets, the Internet, or any combination thereof.

The network environment includes a plurality of network devices 204, 206, 208, 210 and 212. Network devices 204, 206 are coupled to the private network 200. Network devices 210, 212 are coupled to the public network 202. The network device 208 is coupled to, and provides an interface between, both the private network 200 and the public network 202. The network devices are coupled to the public and private networks using any suitable technology such as Ethernet, 1394, or 802.11(b). The network devices are further implemented as any suitable computing devices such as personal computers, servers, handheld devices, printers, switches, routers, bridges, repeaters or the like.

The network device 208 includes a firewall 214 and one or more filters 216. The firewall 214 is a program module or a set of program modules, implemented according to a firewall architecture in which the method according to present invention is utilized. The firewall 214 examines network packets exchanged between the network devices 204, 206, 208 coupled to the private network 200 and the network devices 210, 212 coupled to the public network 202. In an embodiment of the invention, the firewall 214 also examines locally destined network packets sent from, and destined to, network devices within the private network 200.

The firewall 214 is implemented in network device 208 to protect and control network traffic exchanged between the private network 200 and the public network 202, referred to as an edge firewall. Alternatively, the firewall 214 is implemented in, and protects, a single network device such as illustrated in the network device 210, referred to as a host firewall. The firewall is also capable of being implemented as a centrally administered set of hosts and/or edge firewalls in a synchronized manner, referred to as a distributed firewall. Placement of the network device or devices implementing the firewall 214 is preferably selected such that the firewall 216 examines all network traffic destined for the network devices it is supposed to protect.

The filters 216 are implemented as part of the firewall 214. Alternatively, the filters 216 are implemented as part of a separate data structure accessible by the firewall 214. The firewall 214 and filters 216 execute a firewall policy designed to protect network devices 204, 206, 208 from malicious attacks originating from network devices 210, 212 coupled to the public network. The firewall 214 also provides added functionality such as facilitating parental controls, intrusion detection, logging of network packets, and other added filter based functionality.

Each filter 216 includes a set of filter conditions and one or more associated actions. The filter conditions include parameters and information that can be parsed or otherwise obtained from network packets such as interface numbers, hardware addresses, network addresses, protocol type, port numbers, and payload data. The one or more associated actions define how the network device implementing the firewall should treat packets that match the filter conditions. Typical actions include permit, i.e. allow the packet to continue network traversal, and block, i.e. preclude further network traversal by dropping packet.

The firewall 214 examines network packets traversing the network when received at network device 208 and, by comparing the packet parameters to the filter conditions, identifies one or more matching filters. A matching filter results when the filter conditions match the packet parameters. The packet parameters, like filter conditions, include information that is parsed or otherwise obtained from packets. When the firewall identifies a matching filter, the one or more actions associated with the filter conditions are executed.

The term packet as used herein refers to data. The packet may be a network packet formatted according to a network protocol, or a data stream processed by a layer, program, or module.

Figure 3:
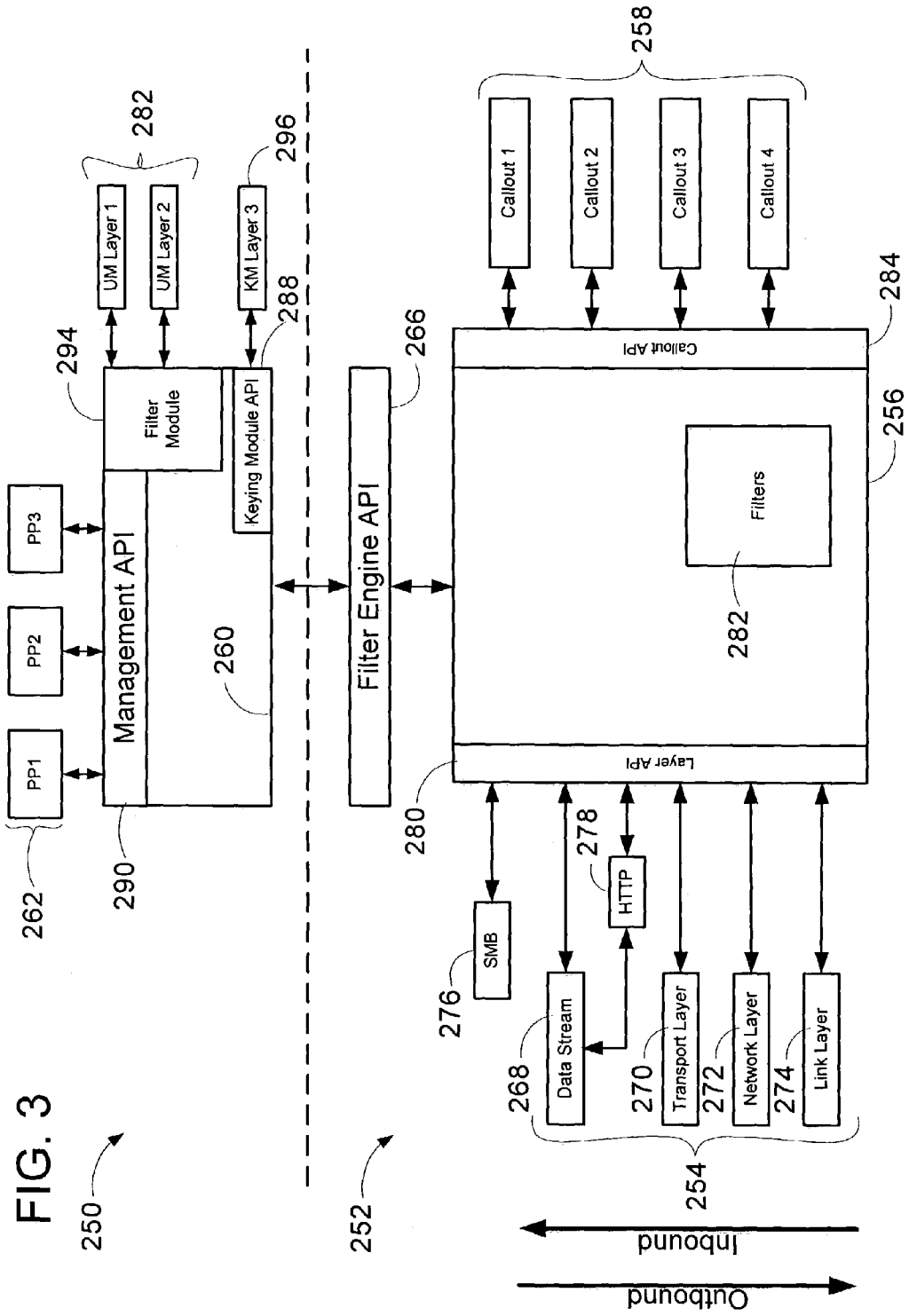
FIG. 3 is a block diagram generally illustrating a firewall architecture in which the methods of the present invention may be used.

FIG. 3 shows an exemplary embodiment of a firewall architecture wherein the method of the present invention may be employed. The method provides the ability to subject packets to filters at all layers of a network stack. The method provides central management capabilities that allow filters to be added and deleted and for filter conflicts to be identified and resolved. The firewall architecture is extensible in that filter layers are added and deleted as needed and is expanded to include specialized functionality beyond permit and block actions. Although the invention is described with specific reference to firewalls and firewall filters, the method is also used to facilitate and manage other filters and policies. As specific examples, the present invention is suitable for facilitating and managing filters used with Quality of Service (QOS), Internet Protocol Security (IPSec) suite, as well as other encrypting, authenticating, and key management protocols.

The firewall architecture includes a user mode process 250 and a kernel mode process 252. The user mode process 250 and kernel mode process 252 execute as part of an operating system in a network device. Those skilled in the art will appreciate that the user mode process 250 and the kernel mode process 252 of the operating system include additional components that for simplicity are not shown. Alternatively, the firewall architecture is executed in whole or in part outside of the operating system as one or more program modules or application programs or within a single operating system process.

The kernel mode process 252 includes a network stack 254, a kernel firewall engine 256, and optional callouts 258. Collectively, the kernel mode process 252 implements an established firewall policy by identifying matching filters for network packets, processing packets according to known protocols, and executing other actions on the packet as designated by matching filters.

The network stack 254 comprises a plurality of layers including a data stream layer 268, a transport layer 270, a network layer 272, and a link layer 274. The firewall architecture is extensible and additional layers are dynamically added or removed as needed. An example of an added layer includes file access layer 276, implemented according to a Server Master Block (SMB) protocol. The layers may work in cooperation with other program modules such as a Hypertext Transfer Protocol (HTTP) parser module 278.

The layers in the network stack 254 process inbound and outbound network packets. Outbound network packets are packets being transmitted from the network device implementing the firewall architecture onto the network. Inbound packets are packets received at the network device implementing the firewall architecture. As indicated by the respective arrows shown in FIG. 3, inbound packets traverse the network stack 254 from bottom to top and outbound packets traverse the network stack 254 from top to bottom.

Network packets traverse, and are processed by, the network layers sequentially. In accordance with known techniques, each layer in the network stack 254 is capable of receiving packets from a previous layer or module, processing the packet according to a specification or protocol, and sending the processed packet to a next layer or module. In accordance with the invention, each layer in the network stack 254 also maintains packet context, passes the packet context to the next layer, issues a classification request to the kernel firewall engine 256, and takes action on the packet according to firewall policy.

The packet context is a data structure that follows the packet from layer to layer. Each layer maintains the context by adding into the context data structure a set of parameters that the layer is designed to process, e.g. the information that the layer is designed to add, parse, or otherwise derive from packets. An exemplary data structure used for the packet context is described with reference to FIG. 5.

One of the operations carried out by the layers of the network stack 254 in accordance with the present invention is to invoke the kernel firewall 256 engine by issuing the classification request. The classification request is a call by a layer in the network stack 254 requesting that any filters that match the packet be identified and any associated policy, e.g. firewall policy, be returned. The layer issuing the classification request is referred to herein as a requesting stage or a requesting layer. Each layer also takes the action on the packet that is returned by the kernel firewall engine 256. User mode layers may also form a requesting layer.

The kernel firewall engine 256 includes a layer API 280, a set of installed filters 282, and a callout API 284. The kernel firewall engine 256 performs various functions according to the method of the present invention including (1) maintaining the set of installed filters 282 defining the firewall policy, (2) receiving classification requests from the layers in the network stack 254, (3) identifying one or more matching filters based on the classification request, and (4) instructing the requesting layer of any policy to be applied to the packet.

Each filter of the set of installed filters includes a set of filter conditions and one or more associated actions. As described with reference to FIG. 2, the filter conditions identify the network packets that are subject to the associated filter action. The actions specified in the set of installed filters 282 include permit and block. Additional functionality is added via optional callouts 258. An exemplary form of the filters is described with reference to FIG. 4.

Figure 6:
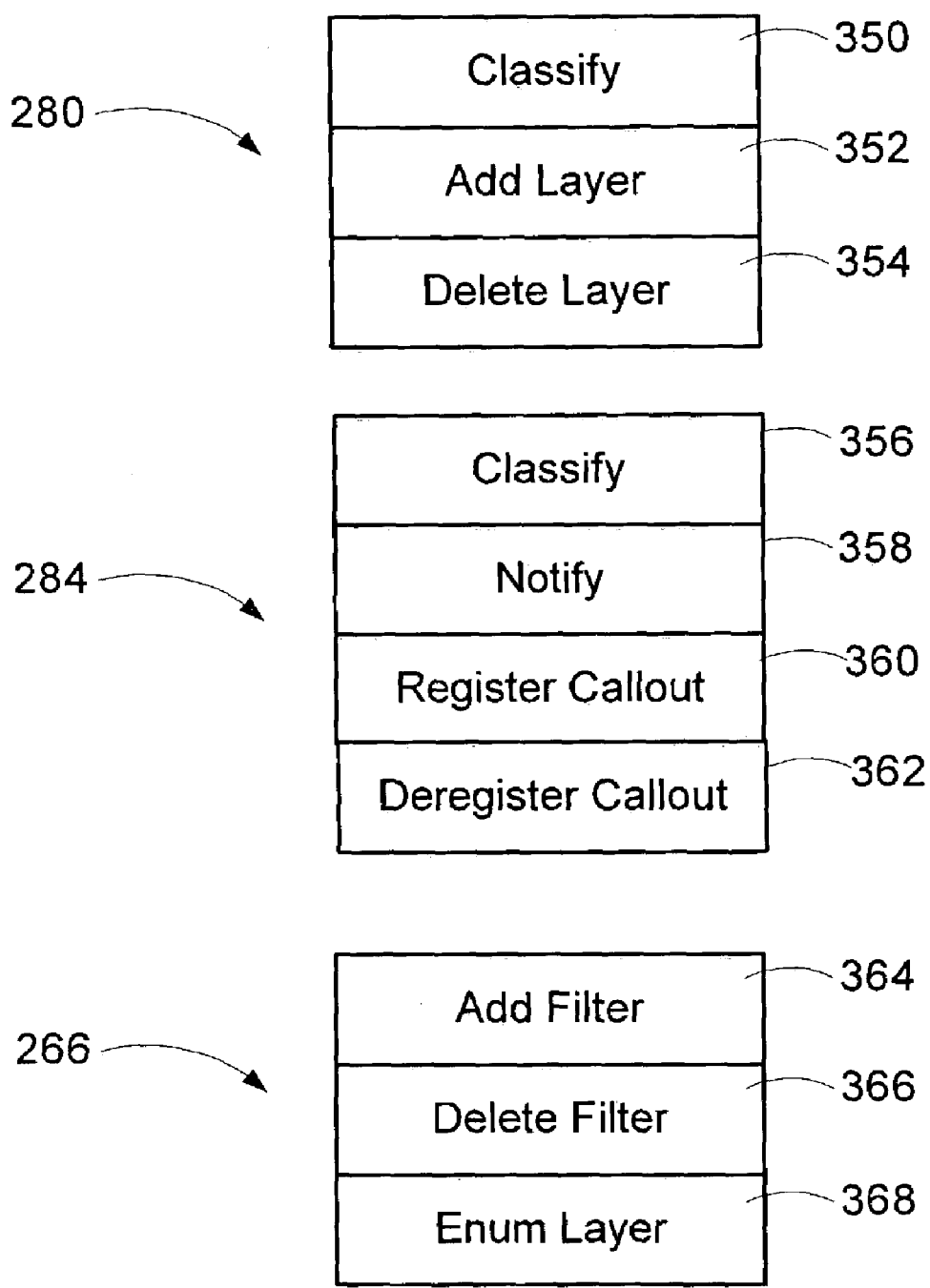
FIG. 6 is a block diagram illustrating an exemplary set of application programming interfaces used with the present invention.

The layer API 280 provides an interface between the layers in the network stack 254 and the kernel firewall engine 256. Through the layer API 280, the requesting layer issues the classification request to the kernel firewall engine 256. The classification request includes the packet as received by requesting layer, the packet context as received by the requesting layer, and layer parameters. The layer parameters are packet parameters processed by, e.g. added or parsed, by the requesting layer. As a specific example, source and destination Internet Protocol (IP) addresses are layer parameters sent by the network layer 272 when implementing the IP protocol. Layer parameters may also include information beyond the packet parameters that are added to or parsed from the packet. As a specific example, the layer parameters include a local address type. The local address type is determined by the IP layer and sent as part of the classification request. Local address types include unicast, broadcast, multicast, anycast and the like. A specific implementation of the layer API 280 is described with reference to FIG. 6.

Optionally, the callouts 258 are used to implement added functionality beyond the permit and block filter actions. A callout is executed when the kernel firewall engine 256 identifies a matching filter for the packet that includes, as the associated action, a callout to one of the callout modules. The kernel firewall engine sends the classification request as issued by the requesting layer, i.e. full packet, layer parameters, and packet context, to the callout module, along with an identification of the matching filter, via the callout API 284. The firewall architecture includes a base set of callouts 258. Additional callouts, like layers, are added as needed thereby providing an extensible architecture. A specific implementation of the callout API 284 is described with reference to FIG. 6.

The user mode process 250 includes the user firewall engine 260 and one or more policy providers 262 identified as "PP1," "PP2," and "PP3." The policy providers 262 are processes that add firewall policy, i.e. installed filters 282, into the firewall architecture. Any process is used to accomplish this task. An example is a legacy IPSec policy service (LIPS). The legacy IPSec policy service adds filters defining network traffic that is supposed to use IPSec protocols such as Encapsulating Security Protocol (ESP) and Authentication Header Protocol (AH). As a specific example, the legacy IPSec policy service adds a firewall policy indicating that all unsolicited inbound packets must be encrypted according to the ESP protocol. The policy further provides that any unsolicited inbound packet in clear text, i.e. an unencrypted packet, should be blocked. The policy providers 262 obtain the policy from any suitable source such as data in volatile or nonvolatile memory, or a Graphical User Interface (GUI) that permits an administrator or system users to directly enter policy. The user firewall engine 260 converts the policy into a new filter, i.e. defines the policy in terms of filter conditions and associated actions, and adds the new filter into the set of installed filters 282.

The user firewall engine 260 also performs filter arbitration and conflict resolution functions. When the policy provider 262 provides new policy to the user mode firewall engine 260, the user firewall engine determines whether the new filter resulting from the new policy conflicts with any of the installed filters 282. If a conflict exists, the user firewall engine 260 resolves the conflict. An example of a method of identifying and resolving conflicts that is suitable for use in the framework of the present invention is described in United States Patent Application entitled "Method for Managing Network Filter Based Policy," attorney docket number 221037.

The architecture further includes a filter engine API 266 that forms an interface between the user mode firewall engine 260 and the kernel firewall engine 256. The filter engine API 266 provides a mechanism for the user firewall engine 260 to add new filters into the set of installed filters 282, and to examine installed filters 282 so that filter conflicts can be detected and resolved. A management API 290 exposes the functionality of the filter engine API 266 to policy providers 262.

The user mode firewall engine 260 also includes a filter module 294. The filter module 294 is an instance of the kernel firewall engine 256 in the user mode 250. The instance of the filter module 294 in the user mode firewall engine 260 permits the user firewall engine 260 to replicate the services of the kernel firewall engine 256 for one or more user mode layers 282. The user mode layers 282 are added in the same way that kernel mode layers are created. Because the filter module 294 is the user mode instance of the kernel firewall engine 256, it will be understood that any functionality described herein for the kernel mode firewall engine also applies to the filter module 294. For example, additional user mode layers are added or deleted from the system architecture and callouts may be created thereby providing added functionality to the user mode layers.

A keying module API 288 provides an interface between the user policy engine 260 and keying module 296. The keying module provides a mechanism to determine which security settings to use for a given packet. The keying module API 288 is used to signal the keying module of the need to establish an SA.

Figures 4, 5:
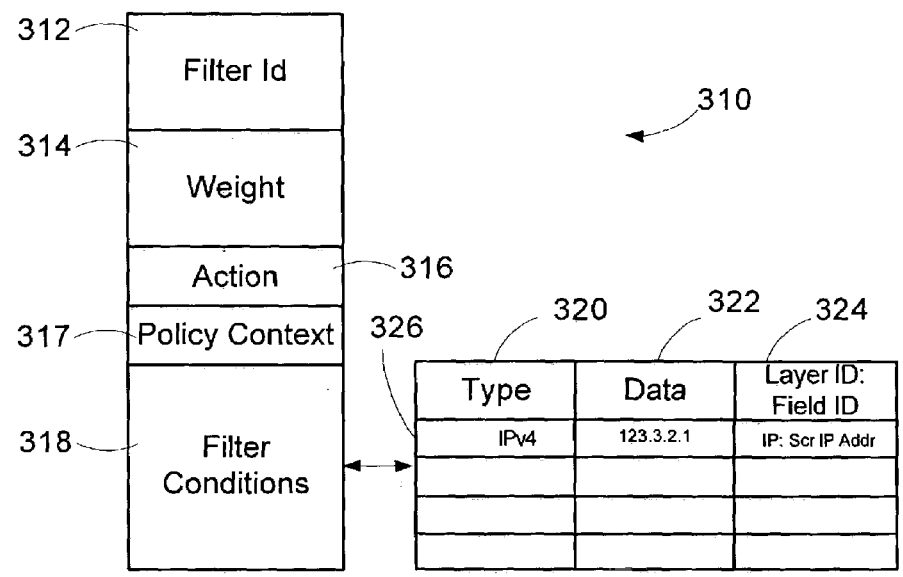
FIG. 4 is a block diagram illustrating an exemplary filter used with the present invention.
FIG. 5 is a block diagram illustrating an exemplary data structure for packet context used with the present invention.

Referring to FIG. 4, the set of installed filters 282 will now be described. Each filter 310 has a plurality of fields including a filter Id 312, a weight 314, one or more actions 316, a policy context 317, and a set of filter conditions 318. The filter Id 312 provides a unique identification to the filter. The filter Id 312 is used, for example, as a means for the kernel firewall engine 256 to return matching filter information to the user firewall engine 260 and the callouts 258. In an embodiment of the invention, the filter 310 is assigned to one of the layers in the network stack 254. The filter Id 312 is used by the kernel firewall engine 256 to track which filter is assigned to which layer.

The weight field 314 includes a value that identifies priority of the filter 310. The higher the value in the weight field 314, the higher the priority of the filter. The filter priority determines the order whereby matching filters are applied to the packet by the kernel firewall engine 256.

In an embodiment of the invention, the filter with the highest priority, i.e. highest weight value, is applied first, then the next highest priority filter is applied and so on, until a matching filter with a terminating action is encountered. Terminating actions are described in more detail below. Once the matching filter with the terminating action is applied, the kernel firewall engine 256 stops applying matching filters. Thus, the action 316 specified by lower priority matching filters are not taken on the packet after the terminating action is applied. Alternatively, the firewall engine 256 identifies a single matching filter and returns a set of actions from the single matching filter. The firewall engine 256 may also apply all matching filters regardless of weight value 314.

The set of filter conditions 318 determine whether a packet matches the filter 310. Each filter condition 318 includes a type 320, data 322, and a layer Id:field Id 324. The type 320 defines the length and number of variables included in the corresponding data 322. The architecture provides for predefined known variable types such as Byte, Short, Long, 8 Bytes, String, Internet Protocol version 4 (IPv4) Address, Internet Protocol version 6 (IPv6) Address, IPv4 Address plus Mask, IPv6 Address plus Mask, and Address Range. The data field 322 includes data matching the type. For example, if the type is IPv4 Address, an acceptable value for the data field 322 is a 32-bit number in range of 00.00.00.00 to 255.255.255.255 as expressed in dotted decimal notation. In some instances, the type 320 provides for multiple values in the data field 322. The Address Range, IPv4 Address plus Mask, and IPv6 Address plus mask types allow two IP address values, defining a beginning and ending range of IP addresses. For maximum flexibility, the architecture also permits user-defined types. Alternatively, additional types are manually added to the system architecture.

The layer Id:field Id 332 is used to identify an originating layer and a parameter from the originating layer, respectively. The originating layer and the parameter from the originating layer define packet parameters, i.e. layer parameters and packet context that the data 322 is compared against. The originating layer identifies a layer in the network stack. The parameter from the originating layer identifies a specific parameter associated with the originating layer. A specific example is illustrated by filter condition 326. The type is IPv4 thereby indicating the data 322 is a 32-bit IP address. The layer Id is "IP" representing that the 32 bit number is an IP, i.e. network, layer parameter. The field Id is "Src IP Addr" which in the example represents an IP layer parameter, specifically a source IP address. The source IP address provided in the data filed is "123.3.2.1" indicating that any packet with that source IP address meets the filter condition thereby matching the filter.

Multiple filter 318 conditions can be specified. When multiple filter conditions 318 are specified, packets match the filter 310 when all filter conditions 318 are satisfied.

The action 316 designated in filter 310 is permit, block, or callout. If the action 316 in the filter 310 is permit or block and the packet matches the filter 310, the permit or block action is returned to the requesting layer by the kernel firewall engine 256. If the action 316 is callout, the kernel firewall engine 256 issues its own classification request that includes the full packet, layer parameters, context and identification of the matching filter to the designated callout module 258. The callout module 258 performs its programmed function on the packet, e.g. intrusion detection. The callout may return an action (either permit, block) to the kernel firewall engine, which in turn relays the action to the requesting layer. The callout may also instruct the kernel firewall engine to continue applying packets without providing a permit or block action. The callout is also capable of maintaining packet context that is likewise returned to the requesting layer via the kernel firewall engine 256.

Actions are designated terminating or non-terminating. As a default, permit and block are designated terminating actions. A terminating action is an action that, once identified in a matching packet, may be used to stop the process of applying matching filters as previously described.

The policy context 317 is used to store policy other than firewall policy, such as security policy or QOS policy. The policy context is any suitable data structure. For example, the policy context is a 64 bit number that is interpreted by a process that added the policy context. The policy context and/or action may also be a null value.

FIG. 5 illustrates an example of a data structure 330 used for the packet context that is maintained by, and passed to, the layers in the network stack 254 and the callout modules 258. The packet context 330 follows the inbound or outbound network packet as it traverses the layers and includes one or more entries, labeled 336-340. Each entry includes a layer Id:field Id 332 and a corresponding value 334.

The layer Id:field Id 332 has the same meaning as the layer Id:field Id 324 provided as part of the filter conditions 318 in the filters 310 (FIG. 4). Namely, the layer Id:field Id 322 identifies the originating layer and the layer parameter from the originating layer for the data in the value field 334. The value field 334 includes a specific layer parameter.

As a specific example, entry 336 includes the layer Id:field Id 332 "NDIS: Src. MAC Addr." "NDIS" represents a Network Driver Interface Specification implementation of the link layer 274 (FIG. 1). "Src MAC addr." represents a source MAC address. Thus, the layer:field Id 332 indicates that the data in the value field 334 is a source MAC address that was processed by the NDIS (Link) layer. The value field 334 includes the actual source MAC address, which in the example is "00.08.74.4F.22.E5" as expressed in hexadecimal notation.

As a second example, entry 338 has a layer Id:field Id 332 of "NDIS:IF No." This again identifies the layer as NDIS, but in this case identifies the parameter as "IF No" representing an interface number as the specific NDIS parameter. The Value field 334 includes the actual interface number, which in this case is 2.

As a third example, entry 340 has a layer Id:field Id 332 of "IP:Dst IP Addr." The "IP" represents the network layer using the IP protocol and the "Dst IP Addr" represents a destination IP address as the IP layer parameter. The value field 334 includes the actual destination IP address of "123.3.2.1."

Having described the underlying firewall architecture, attention is drawn to the functional interfaces of the system and exemplary methods that are performed using the underlying firewall architecture described herein. The functional interfaces are implemented as a plurality of application programming interfaces (APIs). The APIs include the layer API 280, the callout API 284, the filter engine API 266, and the keying module API 288 as illustratively shown in FIG. 6 and FIG. 7.

The layer API 280 facilitates data exchange between each of the layers in the network stack 254 and the kernel firewall engine 256. As shown, the layer API 280 includes a Classify method 350, an Add Layer method 352, and a Delete Layer method 354.

The Classify method 350 is used by the requesting layer to send layer parameters, the packet as received by the requesting, and the packet context to the kernel firewall engine 256. The kernel firewall engine 256 compares the (1) layer parameters from the requesting layer and (2) packet context entries to the filter conditions 318 in each filter 310 assigned to the requesting layer to identify matching filters. The following is an exemplary implementation of the Classify method. It will be understood that the following methods are described as receiving or returning data values. According to known programming techniques, the methods may use pointers to data values instead of actual data values.

```
NTSTATUS
WFPClassify
(
    IN ULONG                          LayerId,
    IN WFP_INCOMING_VALUES*           pInFixedValues,
    IN WFP_INCOMING_CONTEXT_VALUE*    pInContext,
    PVOID                             pPacket,
    OUT WFP_ACTION_TYPE*              pActionType,
    OUT UINT64*                       pOutContext
);
```

Where the following characterizes the recited parameters.

LayerId identifies the layer issuing the classification request, i.e. the requesting layer. Referring to FIG. 3, the layer Id identifies the layer as the data stream layer 268, the transport layer 270, the network layer 272 or the link layer 274. Other layers, including user mode layers, are valid if added to the system. For example, if the SMB layer 276 is added, it has its own unique identification. The firewall architecture of the present invention further permits multiple protocol implementations at a layer in the network stack 254. For example the stack has two transport layers 270, a first transport layer uses the TCP protocol and a second transport layer uses the UDP protocol.

pInFixedValues includes a subset of the layer parameters processed by the requesting layer. The pInFixedValues, along with the packet context entries, are compared to the filter conditions to determine if the packet matches the filter. The default layer parameters included in the pInFixedValues for each layer are identified in Table A below. It will be understood that the default layers are by way of example and not limitation as the layer can include any parameters to which it has access in the pInFixed Values.

TABLE A

| Layer | Default Layer Parameters |
| --- | --- |
| Link Layer | Source and Destination MAC Addresses; Interface Number |
| Network Layer | Source and Destination IP Addresses; Protocol Type; Local Address Type |
| Transport Layer | Source and Destination Port Numbers; |
| Application | Deciphered application layer protocol payload | pInContext includes the context data structure 330 (FIG. 5) as received by the requesting layer. The packet context is used by the kernel firewall engine 256 in conjunction with the layer parameters to identify matching packets.

pPacket includes the entire packet as received by the requesting layer. The pPacket is not used by the kernel firewall engine 256 to identify matching filters. As previously described, the kernel firewall engine 256 uses the pInFixedValues and pInContext to identify matching filters. The pPacket is included in the Classify method so that the kernel firewall engine 256 can send it to one or more callout modules 258 identified as the action 316 in matching filters.

pActionType includes the action 316 that is returned to the requesting layer. The action 316 returned includes permit, block, or none as identified in the matching filter, callout modules executed by the matching filter.

pOutContext includes the policy context data. As previously described, the policy context is used to facilitate network policies associated with IPSec, QOS and any other non-firewall filter based policy.

The Add Layer 352 and Delete Layer 354 methods are used to add and remove a layer from the firewall architecture, respectively. The following is an exemplary form of the Add Layer 352 method.

NTSTATUS

AddExtensionLayer(OUT PULONG pLayerId);

Wherein the following characterizes the recited parameter.

pLayerId is a unique layer identification value returned to the layer being added, i.e. the layer executing the Add Layer method.

The following is an exemplary form of the Delete Layer 406 method.

NTSTATUS

RemoveExtensionLayer(ULONG LayerId);

Wherein the following characterizes the recited parameter.

LayerId identifies the layer being removed; i.e. the layer executing the Delete Layer method.

The callout API 284 facilitates data exchange between the kernel firewall engine 256 and the callouts 258. Like the layer API 280, the callout API 284 has a Classify method. The Classify method 356 of the callout API 284 is similar to the Classify method 350 of the layer API 280 except that it also includes matching filter data. The following is an exemplary form of the Classify method 356 used to execute a callout.

```
typedef NTSTATUS(*WFP_CALLOUT_CLASSIFY_FN)
(
        IN const WFP_INCOMING_VALUES*          fixedValues,
        IN WFP_INCOMING_CONTEXT_VALUE*         wfpContext,
        IN VOID*                               packet,
        IN WFP_FILTER*                         matchedFilter,
        OUT WFP_ACTION_TYPE*                   action,
        OUT UINT64*                            outContext
);
```

Wherein the following characterizes the recited parameters.

fixedValues includes the layer parameters sent from the requesting layer. The fixedValues is the same data provided by the requesting layer in pInFixedValues data sent as part of the Classify method 350 in the layer API 280.

wfpContext includes the context data structure 330 (FIG. 5). This data is the same as sent by the requesting layer in the pInContext sent as part of the Classify method 350 in the layer API 280.

packet includes the entire packet as received by the requesting layer. This data is the same as sent by the requesting layer in the pPacket sent as part of the Classify method 350 in the layer API 280.

matchedFilter identifies the filter requesting the callout. Typically, the matching filter is identified by the filter Id 312 of the matching filter 310 initiating the Classify method 356 of the callout API 284.

pActionType includes the action that is returned to the kernel firewall engine 256 from the callout 258. If the pActionType is permit or block, it is returned to the requesting layer as the pActionType returned by the layer API 280. The callout can also return a continue action that instructs the kernel firewall engine 256 to continue applying matching filters to the packet.

pOutContext includes the policy context data, such as security or QOS policy data.

The callout API 408 also includes the Notify method 358. The Notify method 358 is used to notify a callout when a filter 310 is added to the set of installed filters 282 that identifies as one of its Actions 316, the callout module 258. The Notify provides the callout with an opportunity to take any required action such as allocating or de-allocating buffers that will be used by the callout 258 when it is executed by the kernel firewall engine 256. The following is an exemplary form of the Notify method 358.

```
typedef NTSTATUS(*WFP_CALLOUT_NOTIFY_FN)
(
        IN WFP_NOTIFY_ENUM   notify,
        IN WFP_FILTER*       filter
);
```

Wherein the following characterizes the recited parameters.

notify includes a numerical value that indicates whether the filter is being added or deleted. For example, a value of 1 indicates the filter is being added and a value of 2 indicates that the filter is being deleted.

filter identifies the filter being added or deleted by unique value. This may be accomplished by providing the filter Id 312 included as part of the filter 310.

The callout API also includes a Callout Registration method 360 and Callout Deregistration 362 method to add and remove callout modules, respectively. An exemplary form the Callout Registration method 360 is as follows:

```
NISTATUS WfpRegisterCallout
(
        IN const GUID*                  calloutId,
        IN const WFP_CALLOUT*           callout,
        IN const SECURITY_DESCRIPTOR*   sd
);
```

Wherein the following characterizes the recited parameters.

callout Id provides a unique identification for the registering callout module.

callout provides any callout specific information such as a driver service name, device name, and pointers to the callout classify and notify functions.

sd provides a security descriptor for the callout. The security descriptor identifies which processes and read and delete the callout.

An exemplary form of the Callout Deregistration method 362 is as follows:

```
NTSTATUS WfpDeregisterCallout
(
        IN const GUID*   calloutId
);
```

Wherein the following characterizes the recited parameter.

callout Id is the unique Id of the callout to be removed.

The filter engine API 266 facilitates data exchange between the user mode firewall engine 260 and the kernel mode firewall 256 engine. As shown, the filter engine API 266 includes an Add Filter method 364, a Delete Filter method 366, and an Enum Layer method 368. As previously described, the methods of the filter engine API 266 may be included in the management API 290 to expose the functionality therein to the policy provides 262.

The Add Filter 364 and Delete Filter 366 methods are used to add a new filter to the set of installed filters 282 and to delete an existing filter from the set of installed filters 282, respectively. The following is an exemplary form of the 364.

```
NTSTATUS
AddFilterToLayer
(
        ULONG        LayerId,
        WFP_FILTER*  pFilter
);
```

Wherein the following characterizes the recited parameters.

LayerId identifies the layer assigned to the filter.

pFilter is the filter 310 being added to the set of installed filters 282.

The following is an exemplary form of the Delete Filter method 366.

```
NTSTATUS
DeleteFilterFromLayer
(
        ULONG   LayerId,
        ULONG   FilterId
);
```

Wherein the following characterizes the recited parameters.

LayerId identifies the layer that the filter is assigned to.

pFilter is the filter being deleted from the set of installed filters.

The Enum Layer method 368 provides a mechanism for the user firewall engine 260 to identify all filters matching a set of criteria. This allows the filter engine API to identify conflicting filters for filter arbitration and conflict resolution. The following is an exemplary form of the Enum Layer method 368.

```
IndexStartEnum
(
        PWFP_ENUM_TEMPLATE    pEnumTemplate,
        OUT PULONG            pMatchCount,
        OUT PWFP_ENUM_HANDLE  pEnumHandle
)
```

Wherein the following characterizes the recited parameters:

pEnumTemplate includes a data structure defining the filters to be returned. For example, it include parameters that the filter conditions must match for the filter to be returned.

pMatchCount includes the number of filter matches based on the specified pEnumTemplate.

pEnumHanlde includes a reference to the matched filter entries.

The keying module API 288 provides an interface between user mode keying module layers 282 and the user firewall engine 260. The keying module API 288 includes an IPSec SA Acquire method 370, an Expire Notify method 372, and an IPSec SA Acquire Complete method 374, a Keying Module Register method 376, a Keying Module Deregister method 378, an IPSec Inbound Get SPI method 380, an Add Inbound SA method 382, an Add Outbound SA method 384, an Inbound SA Expire 386 method, and a Keying Module Initiate method 388.

The keying module API is used to facilitate use of security protocols, such as defined by IPSec, used by an initiating computer and a responding computer IPSec includes protocols such as authentication header (AH), and encapsulating security protocol (ESP). The ESP protocol, documented mainly in IETF Request for Comments (RFC) 2406, is an authenticating and encrypting protocol that uses cryptographic mechanisms to provide integrity, source authentication, and confidentiality of data. The AH protocol, documented mainly by IETF RFC 2402, is an authentication protocol that uses a hash signature in the packet header to validate the integrity of the packet data and authenticity of the sender.

The IKE protocol, documented mainly in IETF RFC 2409, provides a method for an initiating computer and a responding computer to negotiate security settings used with the AH and ESP protocols. The negotiated security settings form a data structure called a security association (SA). The SA defines parameters such as an authentication algorithm, encryption algorithm, keys, and the lifetime of keys, used by ESP or AH to protect the contents of an IP packet. Because ESP and AH require an established SA, an IKE negotiation is executed before the ESP or AH protocols are used by the initiating and responding computer. A given SA is identified by a value known as a Security Parameter Index (SPI).

Each of the initiating and responding computers include an IPSec driver that determines, based on an IPSec policy, whether data sent between the initiating and responding computers requires encryption or authentication. The IPSec policy is a set of filters that defines how the network device uses IPSec and includes filter lists, authentication methods, and other information. In an embodiment of the invention, the IPSec policy is defined by filters included in the set of installed filters.

The IPSec SA Acquire method 370 is called by the user firewall engine 260 (via a client proxy) to pass a driver acquire or an external initiate request to the keying module. The keying module returns this call and does the negotiation asynchronously. Once the keying module has completed the negotiation, the keying module layer calls the IPSec SA Acquire Complete method 374 to notify the user firewall engine that the negotiation is complete. The following is an exemplary form of the IPSec SA Acquire method.

```
typedef WIN32_ERR
(*PROCESS_IPSEC_SA_ACQUIRE0)
(
    IN FWP_IPSEC_ACQUIRE_CONTEXT0      ipsecContext,
    IN const FWP_IPSEC_SA_ACQUIRE0*    acquire,
    IN FWP_IPSEC_SPI                   inboundSAspi
);
```

Wherein the following characterizes the recited parameters:

ipsecContext is a handle to link the acquire with the SA being added.

acquire includes the necessary information for negotiating the SA according to known protocols such as (IKE).

inboundSAspi includes a SPI that is used for an inbound SA.

The Expire Notify method 372 is called to pass an expire-notify to the keying module that added the inbound SA. The following is an exemplary form the Expire Notify method.

```
typedef VOID
(*PROCESS_IPSEC_SA_EXPIRE0)
(
    IN const FWP_IPSEC_SA_EXPIRE_NOTIFY0* expireNotify
);
```

Wherein the following characterizes the recited parameters.

expireNotify contains information identifying the expiring SA. For example, in the case of an outbound SA, the SPI is provided.

The IPSec SA Acquire Complete 374 method is called by a keying module to close the user firewall engine's context after it has finished negotiation and added all the SAs, or after it has come across an error. After this method is executed, the keying module layer does not reuse the ipsecContext for any other API method. The following is an exemplary form the IPSec SA Acquire Complete method.

```
WIN32_ERR
FwpIPSecSAAcquireComplete0
(
    IN FWPM_ENGINE_HANDLE              engineHandle,
    IN FWP_IPSEC_ACQUIRE_CONTEXT0      ipsecContext,
    IN const FWP_IPSEC_NEGOTIATION_    status
    STATUS0*
);
```

Wherein the following characterizes the recited parameters.

enginehandle provides a handle to the user firewall engine 260.

ipsecContext is the context passed by user firewall engine with the IPSec Acquire method.

status provides status and other details of the SA negotiation. The status is returned by the user firewall engine 260 if the acquire was externally initiated via FwpKeyingModuleInitiate0.

The Keying Module Register method 376 is called by a keying module layer to register with the user firewall engine 260 and pass its function pointers. The following is an exemplary form of the Keying Module Register method.

```
WIN32_ERR
FwpKeyingModuleRegister0
(
    IN FWPM_ENGINE_HANDLE              engineHandle,
    IN const GUID*                     keyingModuleID,
    IN const FWP_KEYING_MODULE_INFO0*  keymodInfo
);
```

Wherein the following characterizes the recited parameters:

engineHandle provides the handle to the user firewall engine 260.

keyingModuleID is a unique ID for the keying module.

keymodInfo includes registration information about the keying module layer such as pointers to process IPSec SA Acquire and process IPSec SA Expire functions.

The Keying Module Deregister method 378 is called by the keying module to deregister the keying module from the user firewall engine 260. The following is an exemplary form of the Keying Module Deregister method.

```
WIN32_ERR
FwpKeyingModuleDeregister0
(
    IN FWPM_ENGINE_HANDLE    engineHandle,
    IN const GUID*           keyingModuleID
);
```

Wherein the following characterizes the recited parameters:

engineHandle is the handle to the user firewall engine 260.

keyingModuleID is the unique ID of the keying module layer.

The IPSec Inbound Get SPI method 380 is called by the keying module layer to obtain the SPI for a new inbound SA. The IPSec Inbound Get SPI method 380 is usually used when the keying module layer executes in a responding network device. The following is an exemplary form the IPSec Inbound Get SPI method.

```
WIN32_ERR
FwpIPSecSAInboundGetSpi0
(
    IN FWPM_ENGINE_HANDLE      engineHandle,
    IN const FWP_IPSEC_TRAFFIC0*    ipsecTrafficDescription,
    IN const FWP_IPSEC_UDP_ENCAP0*  udpEncapInfo,
    OUT FWP_IPSEC_SPI*         inboundSpi
);
```

Wherein the following characterizes the recited parameters:

engineHandle is the handle to the user firewall engine 260.

ipsecTrafficDescription is a 5-tuple description for creating an inbound larval SA. The 5-tuple includes source and destination IP addresses, source and destination ports, and transport layer protocol type.

udpEncapInfo is UDP encapsulation data for creating the larval SA. UDP encapsulation is a known method of embedding a packet formatted according to a security protocol into an unencrypted UDP packet.

inboundSpi is the SPI for the inbound SA.

The Add Inbound SA method 382 is called by the keying module layer to add an inbound SA, i.e. update the larval SA. The user firewall engine 260 uses the SPI in the SA to map this call to its internal state, and ioctl the SA down to the IPSec driver. The following is an exemplary form of the Add Inbound SA method.

```
WIN32_ERR
FwpIPSecSAInboundAdd0
(
    IN FWPM_ENGINE_HANDLE      engineHandle,
    IN const FWP_IPSEC_SA_STRUCT0*  inboundSA
);
```

Wherein the following characterizes the recited parameters:

engineHandle in the handle to the user firewall engine.

inboundSA includes the inbound SA.

The Add Outbound SA 384 method is called by a keying module to add an outbound SA. The user firewall engine uses an inbound SPI parameter to map this call to its internal state, and ioctl the SA down to the IPSec driver. The following is an exemplary form the Add Outbound SA method.

```
WIN32_ERR
FwpIPSecSAOutboundAdd0
(
    IN FWPM_ENGINE_HANDLE      engineHandle,
    IN FWP_IPSEC_SPI           inboundSpi,
    IN const FWP_IPSEC_SA_STRUCT0*  outboundSA
);
```

Wherein the following characterizes the recited parameters.

engineHandle is the handle to the user firewall engine 260.

onboundSpi is the SPI for the inbound SA, with which an outbound SA is paired.

outboundSA includes the outbound SA.

The Inbound SA Expire method 386 is called by the keying module to expire the inbound SA that was previously added. The following is an exemplary form the Inbound SA Expire method 386.

```
WIN32_ERR
FwpIPSecSAInboundExpire0
(
    IN FWPM_ENGINE_HANDLE      engineHandle,
    IN const FWP_IPSEC_SA_EXPIRE0*  expire
);
```

Wherein the following characterizes the recited parameters.

engineHandle is the handle to the user firewall engine 260.

expire includes data for the SA to be expired.

The Keying Module Initiate method 388 is called by known external application like RAS, Winsock API, and the like to initiate the keying module layer and setup SAs before the application starts sending its network traffic. The user firewall engine 260 asynchronously pends the RPC call, gets the SPI from an IPSec driver, and passes the acquire to the appropriate keying module. Once the keying module layer calls FwpIPSecSAAcquireComplete0, the user firewall engine completes the asynchronous RPC with the negotiation status. The following is an exemplary form of the Keying Module Initiate method.

```
WIN32_ERR
FwpKeyingModuleInitiate0
(
    IN FWPM_ENGINE_HANDLE      engineHandle,
    IN const FWP_IPSEC_SA_ACQUIRE0*  acquire,
    IN HANDLE                  waitEvent,
    OUT FWP_IPSEC_NEGOTIATION_ negotiationStatus
    STATUS0*
);
```

Wherein the following characterizes the recited parameters.

engineHandle is the handle to the user firewall engine 260.

acquire includes data necessary for negotiating an SA.

waitEvent is a handle to an event that is triggered when negotiation status is available. If a client, i.e. calling external application, is not interested in waiting for the negotiation to complete, it can set this parameter to NULL. Internally the client proxy optionally passes this event to RPC and request it to set the event once the asynchronous RPC call completes.

negotiationStatus includes an outcome of the negotiation. The negotiationStatus is NULL if waitEvent is NULL. Otherwise negotiationStatus remains valid until the waitEvent is triggered.

Figure 8:
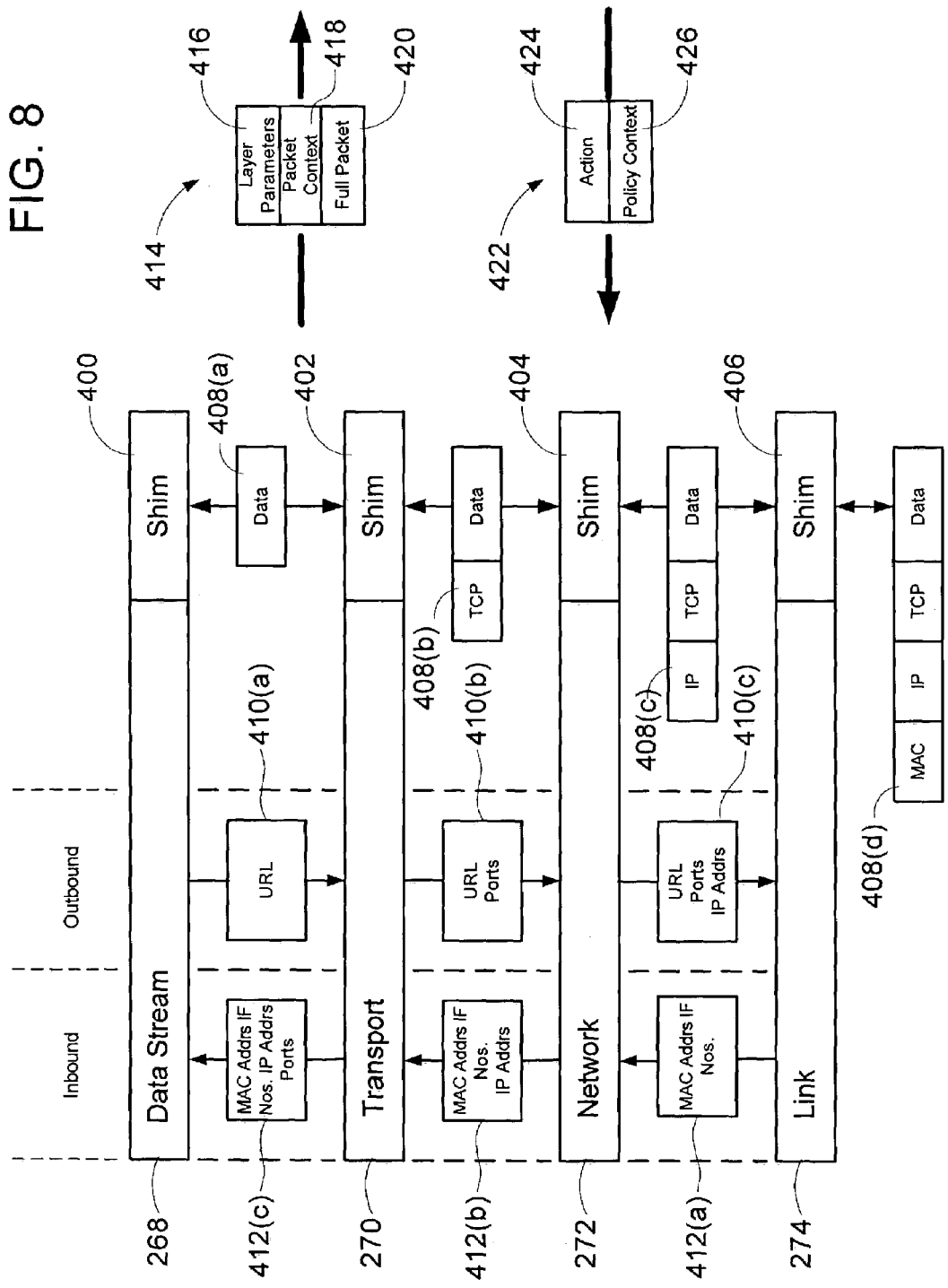
FIG. 8 is a block diagram illustrating functions performed by network layers according to the present invention.

FIG. 8 illustrates the methods used by the layers in the network stack 254 according to the present invention. The method illustrated in FIG. 8 may also be used by one or more user mode layers 282 in concert with the filter module 294 and the user firewall engine 260.

Each layer is capable of a plurality of functions including processing network packets, issuing classification requests to the kernel firewall engine 256, and managing packet context. In an embodiment of the invention, the functions are executed at each of the layers in a shim 400, 402, 404, 406 installed in the network stack 254. Alternatively, the functionality is directly built into the individual layers without the need for the shims.

The network stack 254 includes the data stream layer 268, the transport layer 270, the network layer 272, and the link layer 274. For the purposes of illustrating the present invention, the link layer 274 is implemented as a NDIS driver, the network layer 272 is implemented as an IP layer, the transport layer 270 is implemented as a TCP layer, and the data stream layer 268 is implemented as a HTTP layer. It will be understood that layers may be implemented according to any protocol. For example the transport layer also accommodates a User Datagram Protocol (UDP). The application layer supports File Transfer Protocol (FTP), Remote Procedure Call (RPC), Simple Mail Transfer Protocol (SMTP), Server Master Block (SMB) etc. As previously described, additional layers can be added to the architecture and layers may be deleted. For example, layers are added and deleted using the Add Layer and Delete Layer methods described with reference to FIG. 6.

A network packet, labeled 408(a)-(d), illustrates the network packet as it traverses and is processed by the layers in the network stack 254. If the packet 408(a)-(d) is an inbound packet, it traverses the network stack from bottom to top. If the packet 408(a)-(d) is an outbound packet, it traverses the network stack from top to bottom. While such processing is well known, it is briefly described for the purpose of illustrating the present invention.

Assuming an application executing in a network device, such as a web browser, initiates a request for contents of a web page located on another network device, the application issues the request to the data stream layer 268. In the example, the data stream 264 formats the request according to the HTTP protocol and sends the request to the transport layer in packet 408(a). The transport layer 270 receives packet 408(a). The transport layer 270, which implements the TCP protocol, places the data in one or more packets, and each packet is provided with a TCP header. The TCP header includes information such as the source and destination ports, protocol type, i.e. TCP, sequence numbers, flags, and checksums. The transport layer then sends the packet, labeled 408(b) to the network layer.

The network layer implements the IP protocol and encapsulates the data within an IP header that includes the source and destination IP addresses, flags, checksums and other known information. The IP header also indicates whether the packet is fragmented. A packet is fragmented when the size of the IP packet exceeds a Maximum Transmission Unit (MTU) size for the network technology used to transmit the packet. For example, Ethernet technology specifies that the MTU is 1500 bytes. If the IP packet length exceeds the MTU, it is fragmented into two or more IP packets, each with its own IP header, all of equal or smaller length as compared to the MTU.

In an embodiment of the invention, the network layer is divided into first and second layers. The first layer, referred to as a fragment layer, processes IP packet fragments. The second layer, referred to as a fully assembled layer, processes full IP packets, e.g. before outbound IP packets are fragmented and after inbound IP packets are reassembled into a single IP packet. Following network layer processing and possible fragmentation, the packet 408(c) is sent to the link layer 274. The link layer 274 further packetizes the data by providing a MAC header, with the source and destination MAC addresses, as well as other information. The packet is then sent to a network interface card (NIC) where it is physically transmitted onto the network.

Inbound packets are processed in a reciprocal fashion. Packet 408(d) is received by the NIC and sent to the link layer 274. The MAC header is removed and the packet 408(c) is sent to the network layer where the IP packet fragments are reassembled, if necessary, and the IP header is parsed. The network layer then sends the packet 408(b) to the transport layer where the TCP header is removed and if the data stream was sent in a plurality of TCP packets, the data stream is reassembled. Finally, the data stream 408(a) is sent to the data stream layer 268 where the data is deciphered by the application protocol, in this case the HTTP protocol.

For each outbound packet, the layers of the network stack maintain packet context 410(a)-(c). For each inbound packet, the layers of the network stack maintain packet context 412(a)-(c). The packet context follows each packet as it traverses the network layers. Packet context is also passed to, and may be modified by, the callouts 258 (FIG. 3).

The packet context is updated as the packets are processed at each layer. Each layer adds its layer parameters to the packet context thereby providing this information to subsequent layers or processes. As shown, the link layer 274 adds source and destination MAC addresses and an interface number for an inbound packet as illustrated by context 412(a). That context is received by the network layer 272, which adds source and destination IP addresses as illustrated by context 412(b). The transport layer 266 receives the context and adds the port numbers as illustrated by context 412(a).

A similar process occurs for the context 410(a)-(c) associated with outbound packets. The data stream layer 268 adds information such as a URL address from the packet payload as illustrated by context 410(a), the transport layer 270 further adds source and destination port numbers as illustrated by context 410(b) and the network layer adds source and destination IP addresses as illustrated by context 410(c).

It will be understand that each layer can add any context information available to that layer. Typically, this includes any information that the layer is designed to process, i.e. add or parse or otherwise derive from packets.

Figure 7:
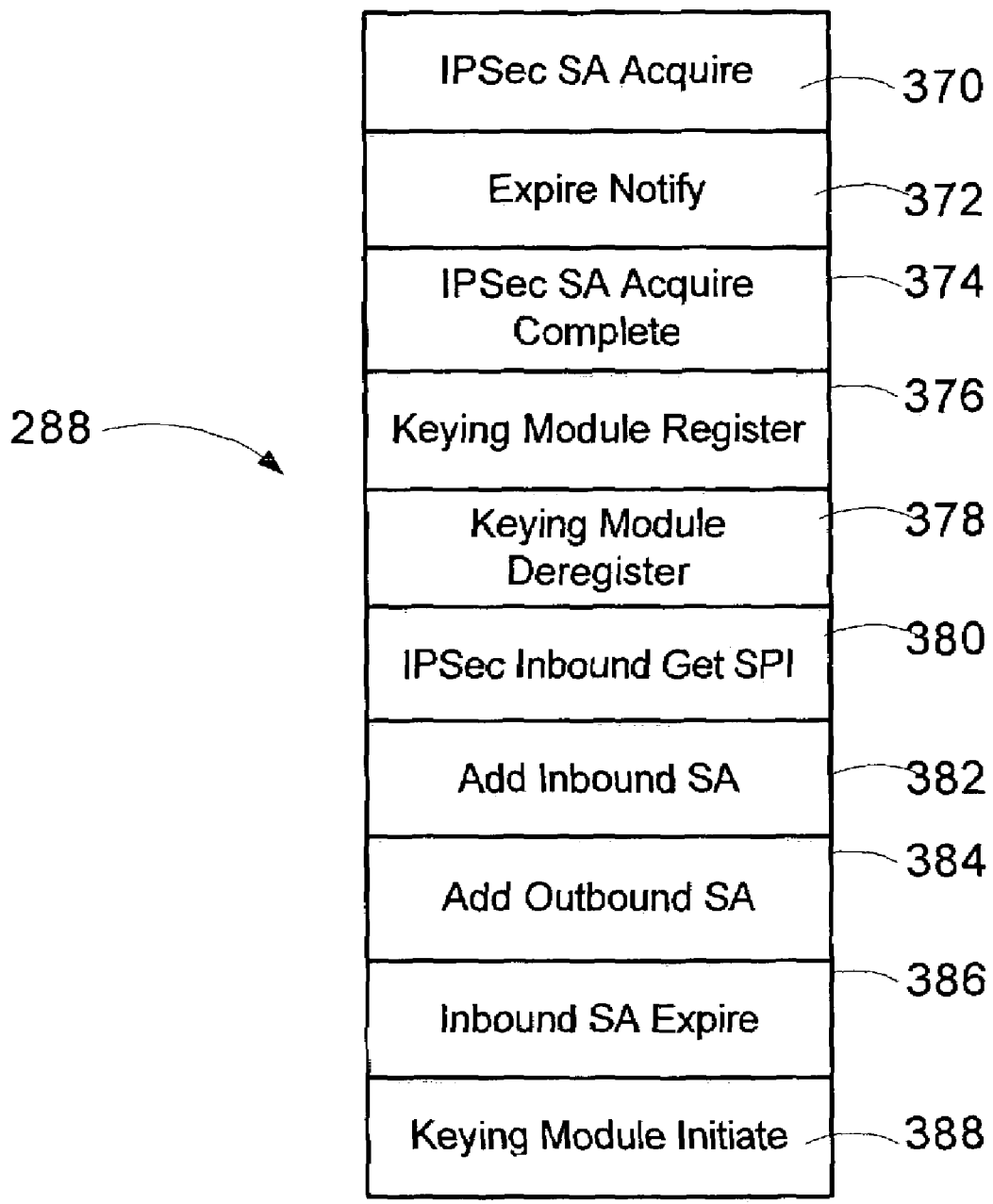
FIG. 7 is a block diagram illustrating an exemplary application programming interface used with the present invention.

When the packet and its corresponding context are received at each layer, the layer functions as a requesting layer by identifying the layer parameters and sending a classification request, labeled 414. The classification request 414 includes, the layer parameters 416, the packet context 418 received from the prior layer, and the full packet 420. An exemplary method used to issue the classification request is the Classify method 350 described with reference to the layer API 280 (FIG. 7).

In response to each classify request, the kernel mode firewall engine 256 compares the layer parameters 416 and packet context 418 to the filter conditions 318 (FIG. 4) of the filters assigned to the requesting layer. The kernel firewall engine 256 sends a response, labeled 422, with the-action 424 from the matching filters 310 with the highest weight 314 to the requesting layer. The kernel firewall engine 256 also returns the policy context 426. If no matching filters are identified by the kernel firewall engine 256, the kernel firewall engine notifies the requesting layer that no matching filters exist. The kernel firewall engine 256 continues to identify matching filters until a matching filter designates a terminating action, i.e. permit or block, or until all filters assigned to the requesting layer are checked, whichever comes first. Alternatively, the kernel firewall engine 256 identifies all matches and returns the actions to the requesting layer in a single response.

As generally illustrated, identifying layer parameters is done as part of the normal layer processing performed by the layers of the network stack 254. Additional packet parsing is not required thereby minimizing impact on system performance. Moreover, because the layers cooperate in maintaining packet context, it is possible to for the firewall engine 256 to compare filter conditions with packet parameters at layers that normally do not have access to those packet parameters. For example, the network layer 268 receives context for inbound packets from the link layer 274 that includes source and destination MAC addresses. Because the network layer 272 issues classification requests with network layer parameters, e.g. source and destination IP addresses, as well as the packet context, the kernel firewall engine 256 can filter on both IP and MAC addresses at the network layer 272 even though the MAC addresses are usually not available.

Figure 9:
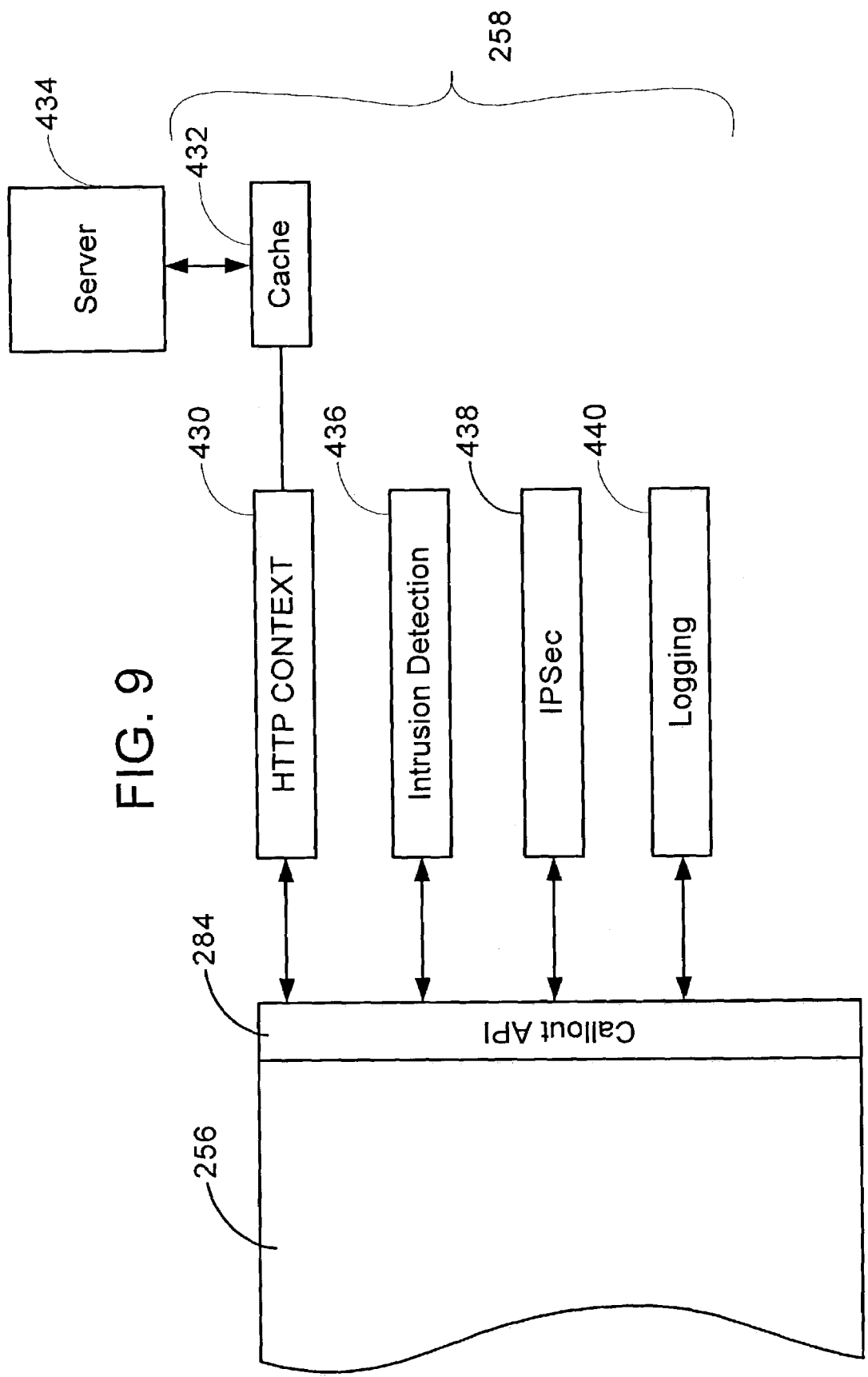
FIG. 9 is a block diagram illustrating an exemplary set of callouts used with the present invention.

Referring to FIG. 9 and exemplary set of callout modules 258 included with the firewall architecture of the present invention will now be described. The callout modules 258 include HTTP context callout 430, intrusion detection callout 436, IPSec callout 438, and logging callout 440.

The HTTP context callout 430 maintains a cache 432 of acceptable, or alternatively, unacceptable URL addresses. The HTTP context callout 430 periodically accesses a server 434 interfaced to the public network that maintains URL addresses and classifies them as acceptable or unacceptable. When the kernel firewall engine 256 executes the HTTP context callout, the callout examines the packet, deciphers the URL address if necessary, and determines if it is acceptable based on information in the cache 432. The HTTP callout then returns permit as the action 316 if the URL address is acceptable and block if the URL address is unacceptable to the kernel mode firewall engine 256, which in turn returns the action 316 to the requesting layer via layer API 280. The HTTP context callout is useful in implementing a parental control function.

The intrusion detection callout 436 uses available algorithms and techniques to examine the packet to identify indicia of viruses or otherwise suspicious packets. If a suspicious packet is detected, an action 316 of block is returned. An example of a suspicious packet is a packet where all flags in IP and TCP headers are set to a value of one. The packet is suspicious because it is never valid and could indicate an attack signature. Alternatively, the intrusion detection callout 436 modifies packet context to flag the suspicious nature of the packet thereby deferring a decision on whether to block the packet to subsequent layers in the network stack.

The IPSec callout 438 is designed to determine to whether a proper security protocol was applied to the packet. The IPSec callout 438 communicates with an IPSec process and determines based on IPSec policy whether the packet was supposed to be subject to IPSec processing. If so, the IPSec callout 438 verifies, based on packet context, whether the packet was in fact subject to the IPSec processing. If the packet was supposed to be processed according to IPSec, but was not, e.g. the packet was in clear text, an action of block is returned. If the packet was subject to IPSec processing, the IPSec callout verifies that the proper SA was applied.

The logging callout 440 is used to save information pertaining to the packet, such as the full packet for later use. Such later use might be, for example, diagnostics for certain network traffic that is unexpectedly not traversing the network because it is being blocked or for tracking malicious attacks on the system.

Figure 10:
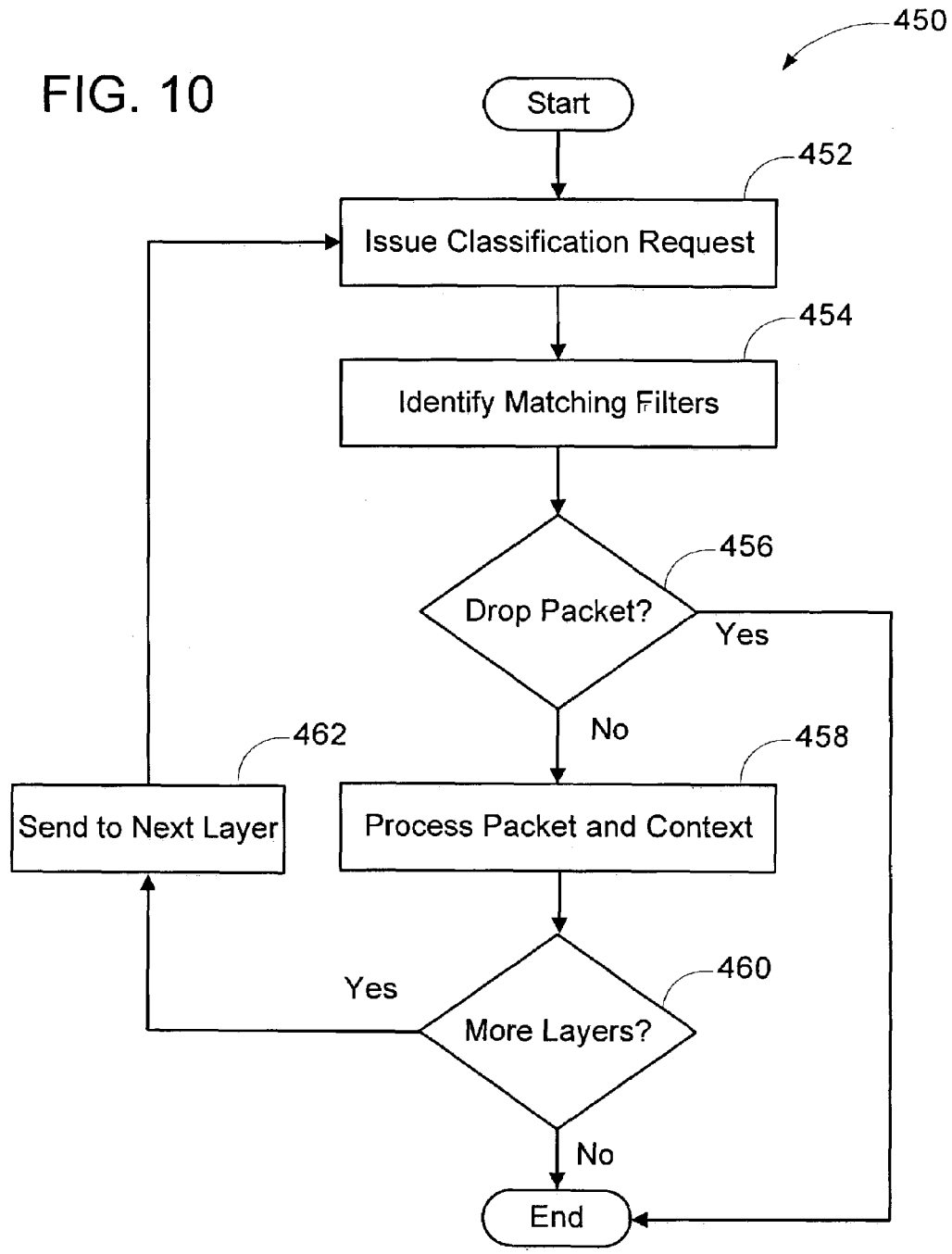
FIG. 10 is a flow chart illustrating an exemplary method used to implement a firewall according to the present invention.

FIG. 10 illustrates a process 450 used to implement the overall firewall function of the present invention. In step 452, the requesting layer issues a classification request for a packet identifying packet parameters in the request. In step 454 filters matching the packet parameters in the classification request are identified. A decision is then made whether the packet should be dropped based on the matching filters as shown in step 456. If the decision is to drop the packet, the packet is dropped and the process ends without further packet processing. If the decision is to not drop the packet, the requesting layer processes the packet according to the protocol implemented at the requesting layer and the packet context data structure is modified as shown in step 458. If there are no additional layers, the process likewise ends. Otherwise, the processed packet and packet context are sent to the next layer as shown in step 462. The process continues until the packet is dropped or until it traverses all layers.

Figure 11:
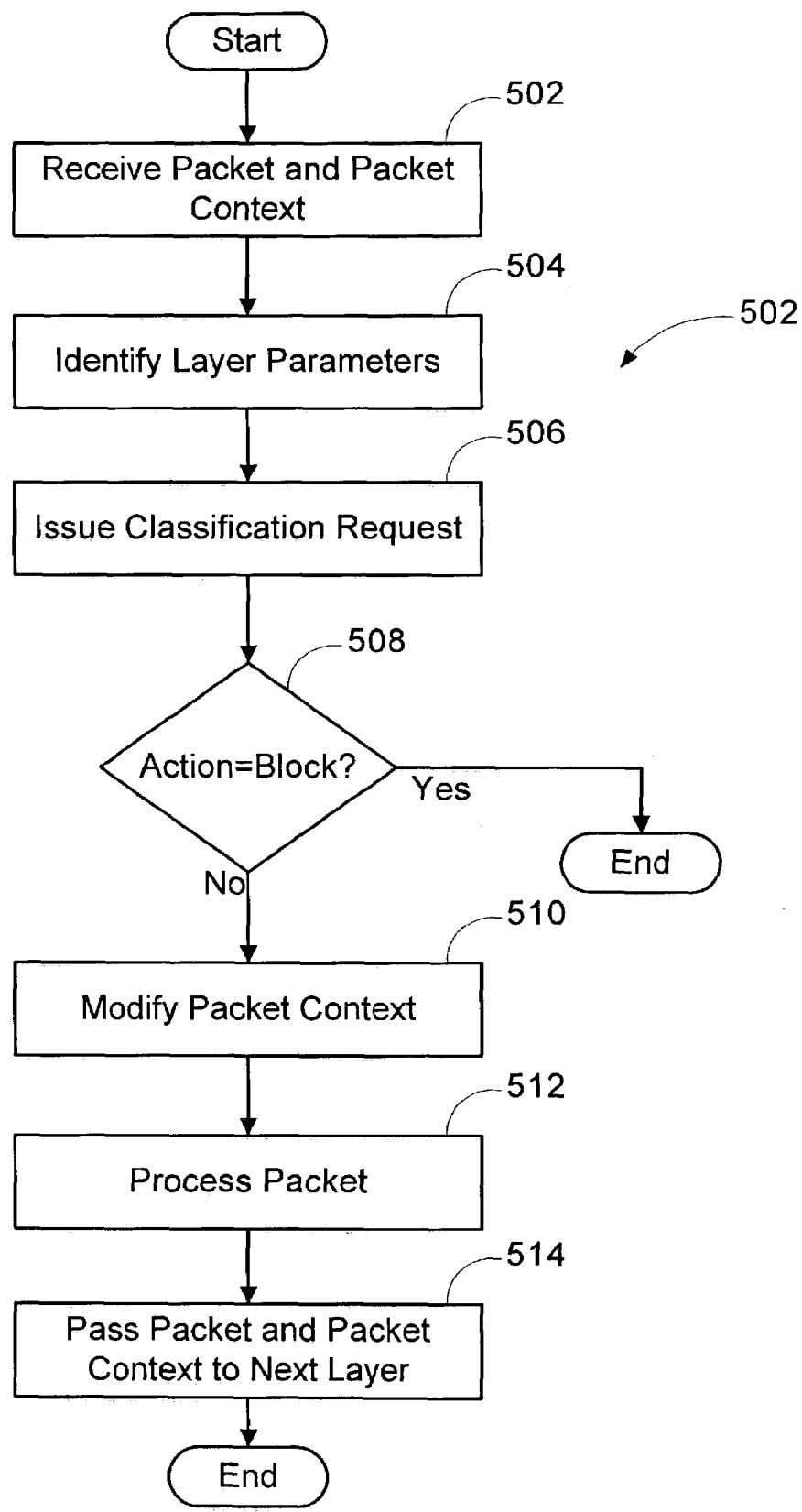
FIG. 11 is a flow chart illustrating an exemplary method used by network layers to implement a firewall.

FIG. 11 illustrates a method, labeled 500, used by the requesting layer to process packets, issue classification requests, and maintain packet context. The method described herein is executed by the shim modules 400, 402, 404, 406 of the various network layers. Alternatively, the method 500 is executed by an integral process from within the layers of the network stack without the need for a separate shim. The method 500 may also be implemented by one or more user mode layers.

In step 502, the requesting layer receives the full packet 408 and corresponding packet context 412 from a previous layer. In the case of outbound packets, the previous layer is higher in the network stack than the requesting layer. In the case of inbound packets, the previous layer is lower in the network stack than the requesting layer.

In step 504 the requesting layer identifies the layer parameters. The layer parameters are the parameters processed by the requesting layer by way of parsing the parameters from inbound packets or adding the parameters to outbound packets. The layer parameters may include other information that can be derived from packets such as the local address type. The default layer parameters are described above in Table A and are included in the pInFixedValues of the Classify method 350 in the layer API 280.

In step 506, the requesting layer issues the classification request to the kernel firewall engine 256. An exemplary method of issuing classification requests was described with the reference to the Classify method 350 in the layer API 280.

In response to the classification request, an action is returned to the requesting layer. The requesting layer determines, based on the returned action, whether to drop the packet 508. If the kernel firewall engine returns block as the action then the requesting layer drops the packet. The requesting layer may also drop the packet if the kernel firewall engine 256 returns the action as no matching filters found. Whether the requesting layer drops packets in the event no matching filters are found is configurable either on a system wide basis or a layer-by-layer basis.

If the returned action is permit, further packet processing occurs. In step 510, the requesting layer modifies the packet context to include layer information, typically the same type of information that was included as the layer parameters in the classification request. Thus, Table A (above) not only identifies the layer parameters but also the default information added by each layer to the packet context. The packet context is maintained in a data structure such as the data structure described with reference to FIG. 5.

In step 512, the requesting layer processes the packet according to the protocol implementation for that layer. Such processing is well known and need not be described in detail herein. Exemplary protocol implementations include HTTP, FTP, SMTP, and RPC for the application layer, TCP and UDP for the transport layer, IP for the network layer, and NDIS for the link layer.

In step 514, the requesting layer passes the packet, processed according to the layer protocol, along with the modified packet context to a next layer. If the packet is an inbound packet, the next layer is a higher layer in the network stack. If the packet is an outbound packet, the next layer is a lower layer in the network stack. The process 500 is repeated by each layer in the network stack and continues until the packet traverses all layers in the network stack or until the packet is dropped by one of the layers in the network stack.

Figure 12:
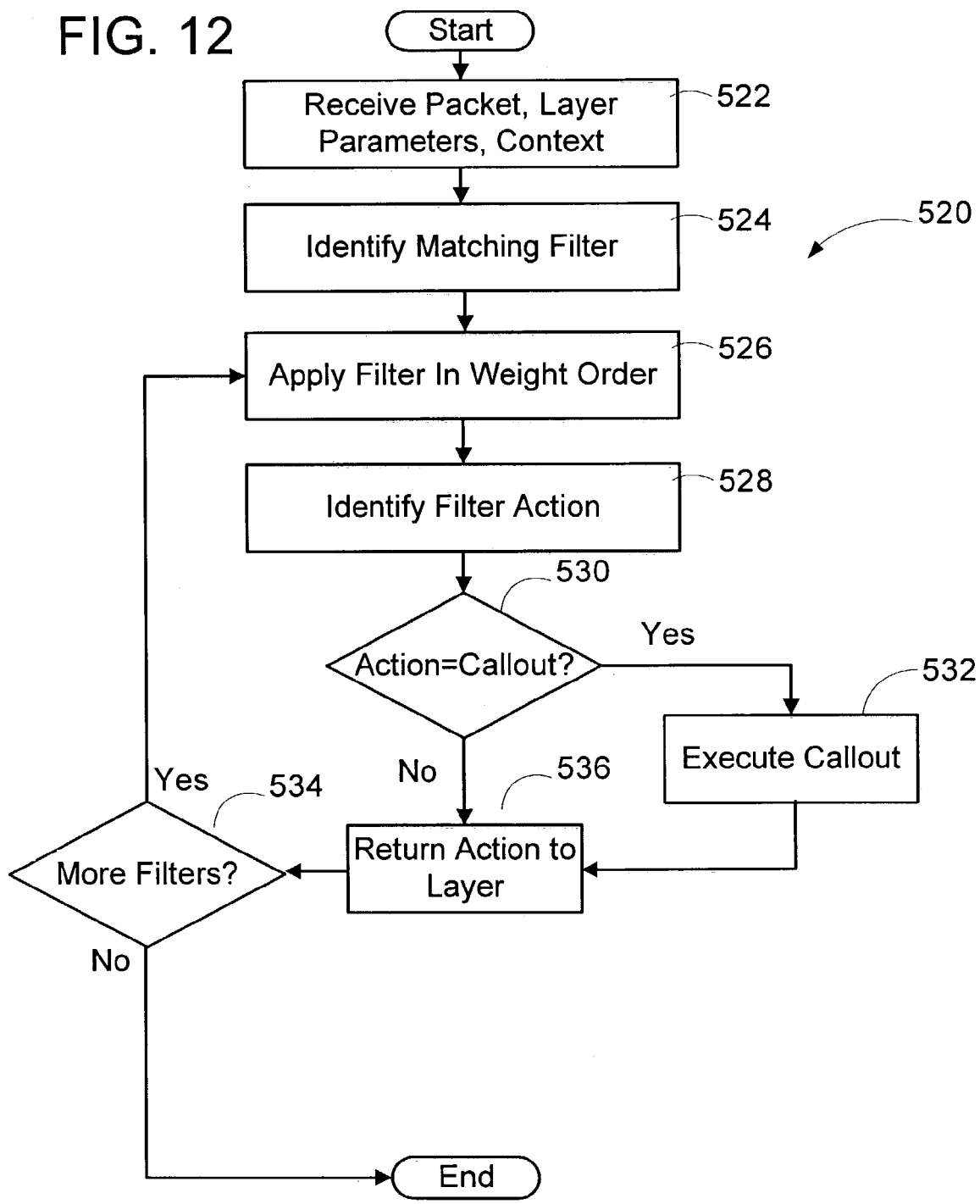
FIG. 12 is a flow chart illustrating an exemplary method used by a firewall engine to implement a firewall.

Referring to FIG. 12, an exemplary method 520 used by the kernel firewall engine 256 to identify matching filters and return the action to the requesting layer will now be described. As previously described, the functionality of the kernel firewall engine 256 may also be carried out by filter module 294 executing in the user firewall engine.

In step 522, the kernel firewall engine 256 receives the packet, layer parameters, and packet context from the requesting layer via the layer API 280 using, for example, the Classify method 350.

In step 524, the kernel firewall engine identifies one or more matching filters. In an embodiment of the invention, filters are assigned to a particular requesting layer. The kernel firewall engine 256 only attempts to identify filters as matching if the filter is assigned to the requesting layer and the packet parameters match all filter conditions 318 (FIG. 5). As previously described the packet parameters include both layer parameters from the requesting layers and the packet context. After all matching filters are identified, the kernel firewall engine orders the filters based on the weight field 314 in each matching filter.

In step 526, the kernel firewall engine 256 applies the filter with the highest weight field 314 that has not yet been applied. Specifically, the kernel firewall engine 256 identifies the action 316 specified in the filter. If the action 316 designates one of the callout modules 258, the kernel firewall engine 256 executes the callout via the callout API 284 as shown in step 532. An exemplary method used to execute the callout was described with reference to the Classify method 356 (FIG. 6) in the callout API. The callout may return an action to the kernel firewall engine 256.

If the action was not callout, or after the callout is executed, the kernel firewall engine returns an associated action from the matching filter or as identified by the callout, to the requesting layer as shown in step 536. Alternatively, the kernel firewall engine 256 waits to return the action until all matching filters have been applied.

In step 534, the kernel firewall engine 256 determines if any additional matching filters exist. If not the process terminates. If additional matching filters do exist, the process returns to step 526 where the next highest priority filter is applied. The process continues until all matching filters are applied. Alternatively, the process terminates once a terminating action is identified for the packet. If no matching filters are identified for the packet, the kernel firewall engine notifies the requesting layer that no matching filters were found. The requesting layer then determines how to treat the packet, i.e whether to permit or block the packet.

Figure 13:
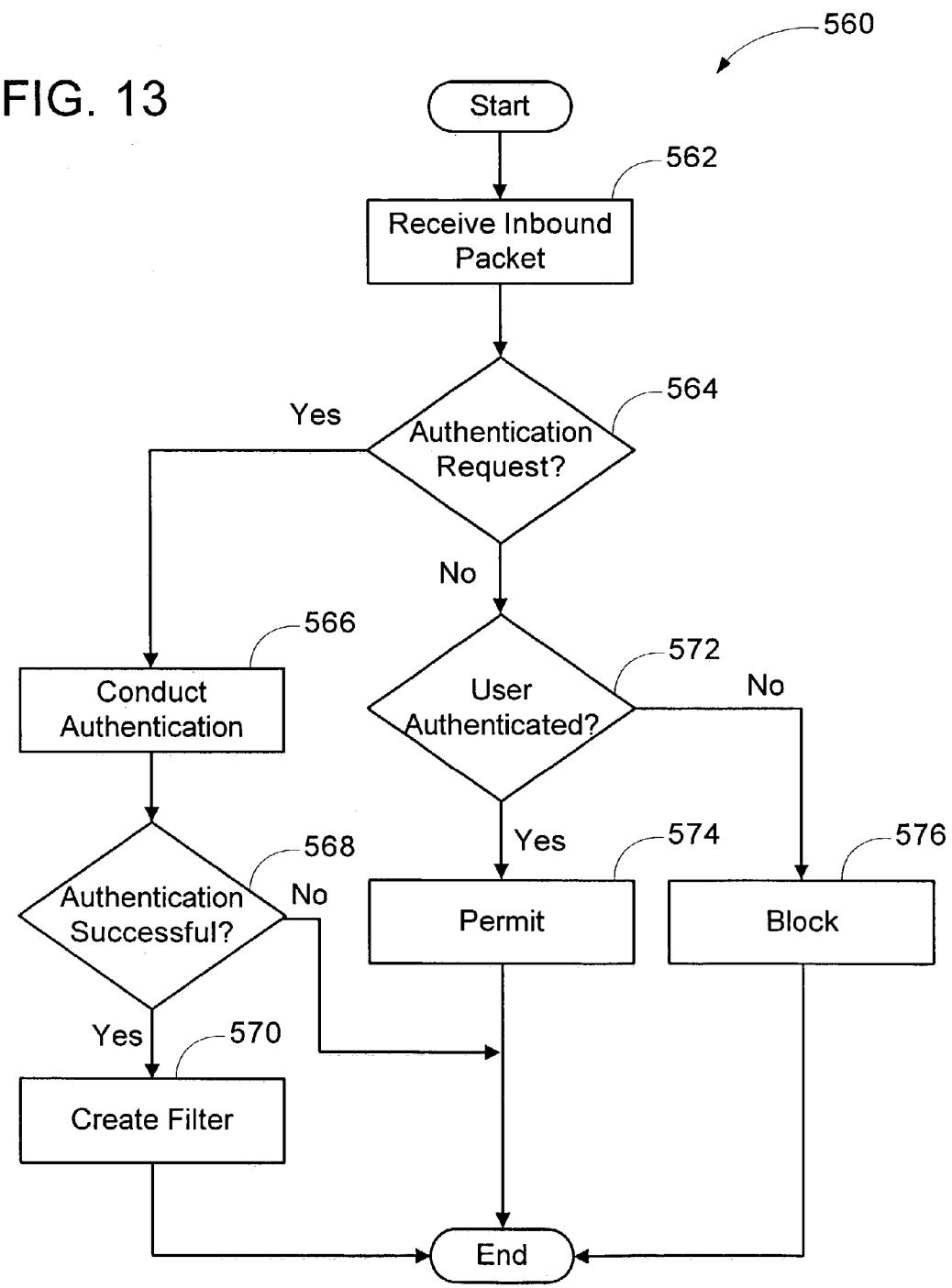
FIG. 13 is a flow chart illustrating a method used to permit unsolicited communication through a firewall initiated by a trusted network device.

FIG. 13 illustrates a method 560 used according to the present invention to prevent malicious attacks from unsolicited inbound packets while permitting communication with a trusted user initiating communication from an unknown network address.

In step 562, a responding computer implementing the firewall of the present invention receives an unsolicited inbound packet. The process 560 determines whether the inbound packet is an authentication request at step 564. An authentication request may, for example, be according to the IKE protocol. If the inbound packet is an authentication request, the responding computer attempts to authenticate the initiating computer as shown in step 568. One method used to authenticate the initiating computer is through a digital certificate. The digital certificate is issued by a certification authority (CA) and includes information such as user name, a serial number, expiration dates, a copy of a public key (used for encrypting messages and digital signatures), and a digital signature of the CA so that a recipient can verify that the certificate is real.

The process then determines if the authentication process was successful in step 568. If the authentication was unsuccessful, i.e. the responding computer could not authenticate the initiating computer, the process ends.

If the authentication process was successful, a new filter is created as shown in step 570. The new filter includes filter conditions that match address information for the responding computer, such as IP address, port number protocol type and like and the like and includes as the associated Action permit. Alternatively the new filter has conditions that match agreed upon security setting between the initiating and responding computers. As shown in step 572, when an inbound packet is received that is not an authentication request, the process determines if the initiating computer has been authenticated, i.e. whether a matching filter with an action of permit exists. If a matching filter has permit as the action, the packet is permitted to traverse the network as shown in step 574 Otherwise, the packet is blocked from further network traversal as shown in step 576.

As an alternative to the method 560 to provide secure communications from an unsolicited user, a filter is created that requires all inbound packets to conform to a security protocol such as provided for by IPSec. Thus, before a packet can get through the filter without being blocked it must first establish an SA authenticated as described in step 566.

All of the references cited herein, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Additionally, those skilled in the art will recognize that other processes use filters, such as QOS and IPSec. The invention of the present invention can be used to manage and execute filters and filter based polices of these and additional processes. Therefore, the invention as described herein contemplates all such embodiments as may come within the scope of the following claims and equivalents thereof.

We claim:

1. A method for implementing a firewall policy at a requesting stage, the requesting stage being a first stage from a plurality of stages in a firewall framework, the firewall framework further including a firewall engine having a plurality of installed filters, comprising:
   receiving, by the requesting stage, a packet from a second stage from the plurality of stages;
   identifying, by the requesting stage, a set of parameters associated with the packet;
   issuing a classify call including the set of parameters associated with the packet;
   receiving, in response to the classify call, an action according to the firewall policy designated by at least one of the plurality of the installed filters; and
   if the action is an instruction to allow the packet to continue network traversal, processing the packet according to a protocol implemented by the requesting stage and sending the packet to a third stage from the plurality of stages.

2. The method of claim 1, wherein the action is the instruction to allow the packet to continue network traversal, further comprising:
   processing the packet according to a layer protocol; and
   sending the packet to the third stage from the plurality of stages.

3. The method of claim 1, wherein the packet is an outbound packet destined for a network device and wherein the set of parameters include information to be added to the packet according to a protocol implemented by the requesting stage.

4. The method of claim 1, wherein the packet is an inbound packet received from a network device and wherein the set of parameters include information that the requesting stage parses from the inbound packet according to a protocol implemented by the requesting stage.

5. The method of claim 1, wherein the plurality of stages execute within a kernel mode of an operating system.

6. The method of claim 1 wherein the plurality of stages execute within a user mode of an operating system.

7. The method of claim 1 further comprising:
   receiving a packet context data structure from the second stage, the packet context including second stage data associated with the packet; and
   modifying the packet context data structure by adding the set of parameters.

8. The method of claim 7 wherein parameters of the set of parameters includes identification of the requesting stage, the parameter type, and a value.

9. The method of claim 7, wherein the requesting stage sends the modified packet context data structure to a next stage in the plurality of stages.

10. A method for implementing a firewall policy in a firewall engine comprising a set of installed filters, the installed filters each comprising a set of filter conditions and an associated action, comprising:
    receiving from a requesting layer a set of packet parameters including first packet information associated with the requesting layer and second packet information associated with a packet context data structure;
    identifying a set of matching filters, each filter in the set of matching filters having filter conditions corresponding the packet parameters;
    identifying the associated action from at least one of the matching filters; and
    if the associated action is an instruction to allow the packet to continue network traversal or an instruction to disallow the packet to continue network traversal, returning the associated action to the requesting layer.

11. The method of claim 10, wherein each filter in the set of matching filters has a priority and the associated action from a highest priority filter is a non-terminating action, further comprising:
    identify the associated action from one or more lower priority filters in the set of matching filters until a terminating action is reached.

12. The method of claim 10, wherein a filter from the set of matching filter identifies a callout module, further comprising:
    sending the packet parameters and an identification of the filter from the set of matching filters to the callout module.

13. The method of claim 12, wherein the callout modifies the packet context.

14. The method of claim 10, wherein the firewall engine executes in a user mode of an operating system.

15. The method of claim 10, wherein the firewall engine executes in a kernelmode of an operating system.

16. A method for permitting network communication between an initiating network device and a responding network device, the responding network device including a firewall for preventing unsolicited network communications, comprising:
    receiving, by the responding network device, an inbound packet from the initiating network device;
    determining whether the inbound packet is an authentication request;
    if the inbound packet is the authentication request;
       conducting a key negotiation between the initiating network device and the responding network device according to the key negotiation protocol;
       if the key negotiation is successful:
          creating a firewall filter that permits inbound packets sent from the initiating network device that conform to the key negotiation protocol; and
    if the inbound packet is not the authentication request:
       determining whether the initiating network device has been previously authenticated; and
       if the initiating network device has been previously authenticated, permitting the inbound packet.

17. The method of claim 16, wherein the firewall filter permits inbound packets conforming to a security settings between the initiating network device and the responding network device.

18. The method of claim 16, wherein the firewall filter permits inbound packets designating address information of the responding network device.

19. The method of claim 16 wherein the key negotiation is an IKE negotiation.

20. A computer-readable medium for executing computer-readable instructions for implementing a firewall policy at a requesting stage, the requesting stage being a first stage from a plurality of stages in a firewall framework, the firewall framework further including a firewall engine having a plurality of installed filters, comprising:
  receiving, by the requesting stage, a packet from a second stage from the plurality of stages;
  identifying, by the requesting stage, a set of parameters associated with the packet;
  issuing a classify call including the set of parameters associated with the packet;
  receiving, in response to the classify call, an action according to the firewall policy designated by at least one of the plurality of the installed filters; and
  if the action is an instruction to allow the packet to continue network traversal, processing the packet according to a protocol implemented by the requesting stage and sending the packet to a third stage from the plurality of stages.

21. The computer-readable medium of claim 20, wherein the action is the instruction to allow the packet to continue network traversal, further comprising:
  processing the packet according to a layer protocol; and
  sending the packet to the third stage from the plurality of stages.

22. The computer-readable medium of claim 20 further comprising: receiving a packet context data structure from the second stage, the packet context including second stage data associated with the packet; and
  modifying the packet context data structure by adding the set of parameters.

23. A computer-readable medium for executing computer-readable instructions for implementing a firewall policy in a firewall engine comprising a set of installed filters, the installed filters each comprising a set of filter conditions and an associated action, comprising:
  receiving from a requesting layer a set of packet parameters including first packet information associated with the requesting layer and second packet information associated with a packet context data structure;
  identifying a set of matching filters, each filter in the set of matching filters having filter conditions corresponding the packet parameters;
  identifying the associated action from at least one of the matching filters; and
  if the associated action is an instruction to allow the packet to continue network traversal or an instruction to disallow the packet to continue network traversal, returning the associated action to the requesting layer.

24. The computer-readable medium of claim 23, wherein each filter in the set of matching filters has a priority and the associated action from a highest priority filter is a non-terminating action, further comprising:
  identify the associated action from one or more lower priority filters in the set of matching filters until a terminating action is reached.

25. The computer-readable medium of claim 23, wherein a filter from the set of matching filter identifies a callout module, further comprising:
  sending the packet parameters and an identification of the filter from the set of matching filters to the callout module.

26. A computer-readable medium for executing computer-readable instructions for permitting network communication between an initiating network device and a responding network device, the responding network device including a firewall for preventing unsolicited network communications, comprising:
  receiving, by the responding network device, an inbound packet from the initiating network device:
  determining whether the inbound packet is an authentication request;
  if the inbound packet is the authentication request:
    conducting a key negotiation between the initiating network device and the responding network device according to the key negotiation protocol;
    if the key negotiation is successful:
      creating a firewall filter that permits inbound packets sent from the initiating network device that conform to the key negotiation protocol; and
  if the inbound packet is not the authentication request:
    determining whether the initiating network device has been previously authenticated; and
    if the initiating network device has been previously authenticated, permitting the inbound packet.

27. The computer-readable medium of claim 26, wherein the firewall filter permits inbound packets conforming to security settings between the initiating network device and the responding network device.

28. The computer-readable medium of claim 26, wherein the firewall filter permits inbound packets designating address information of the responding network device.

* * * * *